United States Patent [19]

Kubo et al.

[11] Patent Number: 5,405,299

[45] Date of Patent: Apr. 11, 1995

[54] TOOTHED BELT AND TOOTHED BELT-ADAPTED PULLEY

[75] Inventors: Takaharu Kubo, Sayama; Reiji Sato, Itabashi; Takeshi Oba, Kodiara; Akira Nakaegawa, Yokohama; Yoshihide Fukahori, Hachiouji, all of Japan

[73] Assignee: Bridgestone Corporation, Tokyo, Japan

[21] Appl. No.: 168,378

[22] Filed: Dec. 17, 1993

[30] Foreign Application Priority Data

Dec. 29, 1992 [JP] Japan .................................. 4-360621
Feb. 24, 1993 [JP] Japan .................................. 5-035159

[51] Int. Cl.⁶ .............................................. F16G 1/28
[52] U.S. Cl. .................................................. 474/205
[58] Field of Search ................ 474/202, 204, 205, 153

[56] References Cited

U.S. PATENT DOCUMENTS

| | | | |
|---|---|---|---|
| 4,586,915 | 5/1986 | Cathey et al. | 474/205 |
| 4,878,886 | 11/1989 | Kitabayashi et al. | 474/205 X |
| 4,915,674 | 4/1990 | Tanaka et al. | 474/153 |
| 4,929,221 | 5/1990 | Tanaka et al. | 474/205 |
| 4,993,998 | 2/1991 | Tanaka et al. | 474/205 |

FOREIGN PATENT DOCUMENTS

| | | |
|---|---|---|
| 52-20629 | 6/1977 | Japan . |
| 56-29141 | 7/1981 | Japan . |
| 56-37457 | 8/1981 | Japan . |
| 57-1714 | 1/1982 | Japan . |
| 57-51589 | 11/1982 | Japan . |
| 1558766 | 1/1980 | United Kingdom . |

OTHER PUBLICATIONS

Wataru Seki et al.; "A Large-Deformation Finite-Element Analysis for Multilayer Elastomeric Bearings" (Presented at a meeting of the Rubber Division, American Chemical Society, Montreal, Quebec, Canada); May 26-29, 1987; pp. 856-869.

*Primary Examiner*—Michael Powell Buiz
*Attorney, Agent, or Firm*—Oliff & Berridge

[57] ABSTRACT

A toothed belt and belt-adapted pulley system provides a high-load capacity and increased durability by reducing stress concentrations on dedendum portions and further preventing localized bending of belt tensile cords. Smooth engagement of elastic teeth of a belt is possible due to minimization of interference between the elastic teeth upon engagement or disengagement with a pulley. Reduced vibration, low noise, and a reduction in skipping under high loads result from the inventive system. Each tooth of the belt has a peripheral length $m_0$ and a dedendum portion with a length $m_1$, where $m_1/m_0$ is 0.1 or less. Each tooth of the pulley has a peripheral length $n_0$ and a dedendum portion having a length $n_1$, where $n_1/n_0$ is 0.1 or less.

9 Claims, 21 Drawing Sheets

PRIOR ART

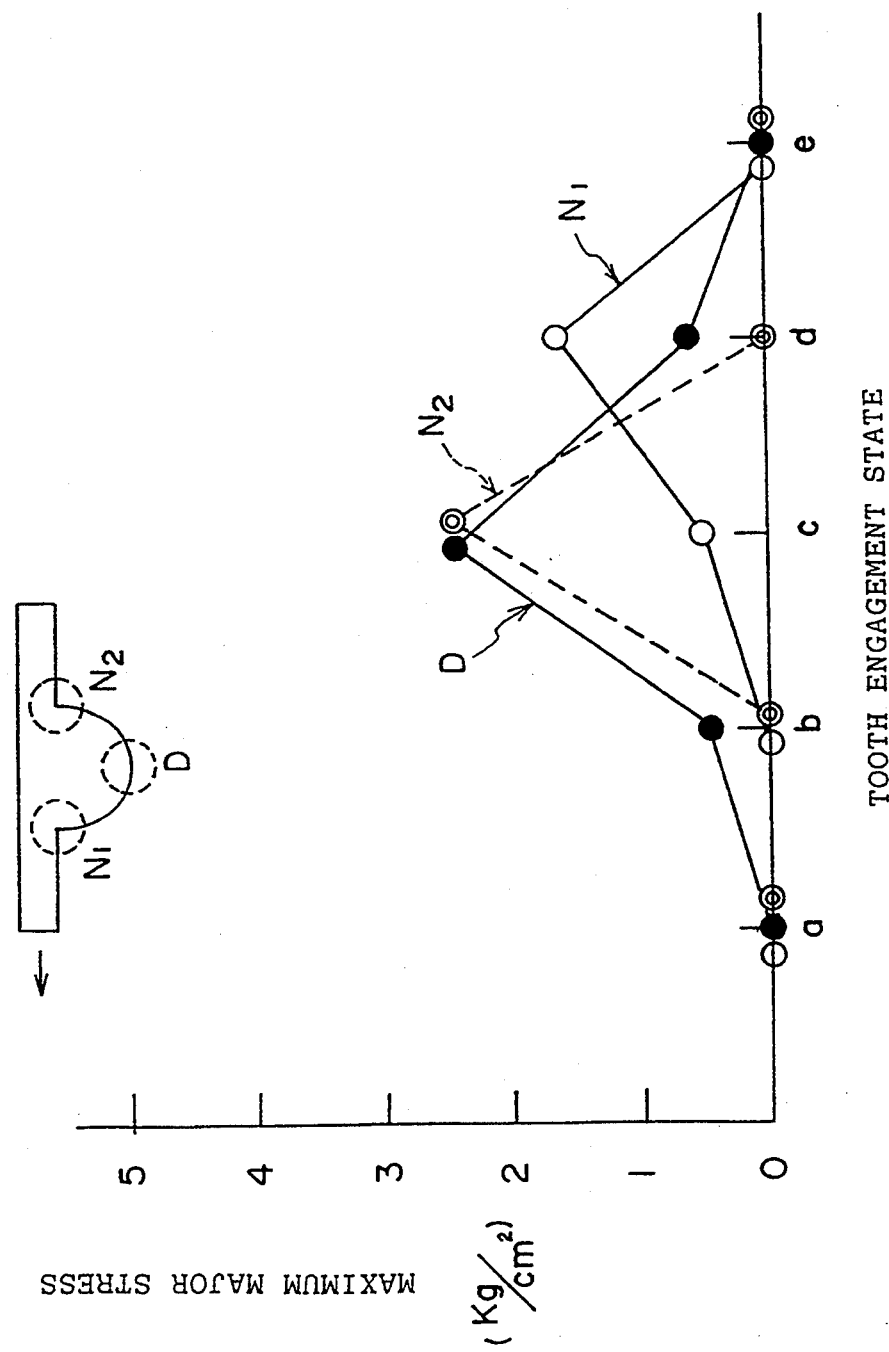

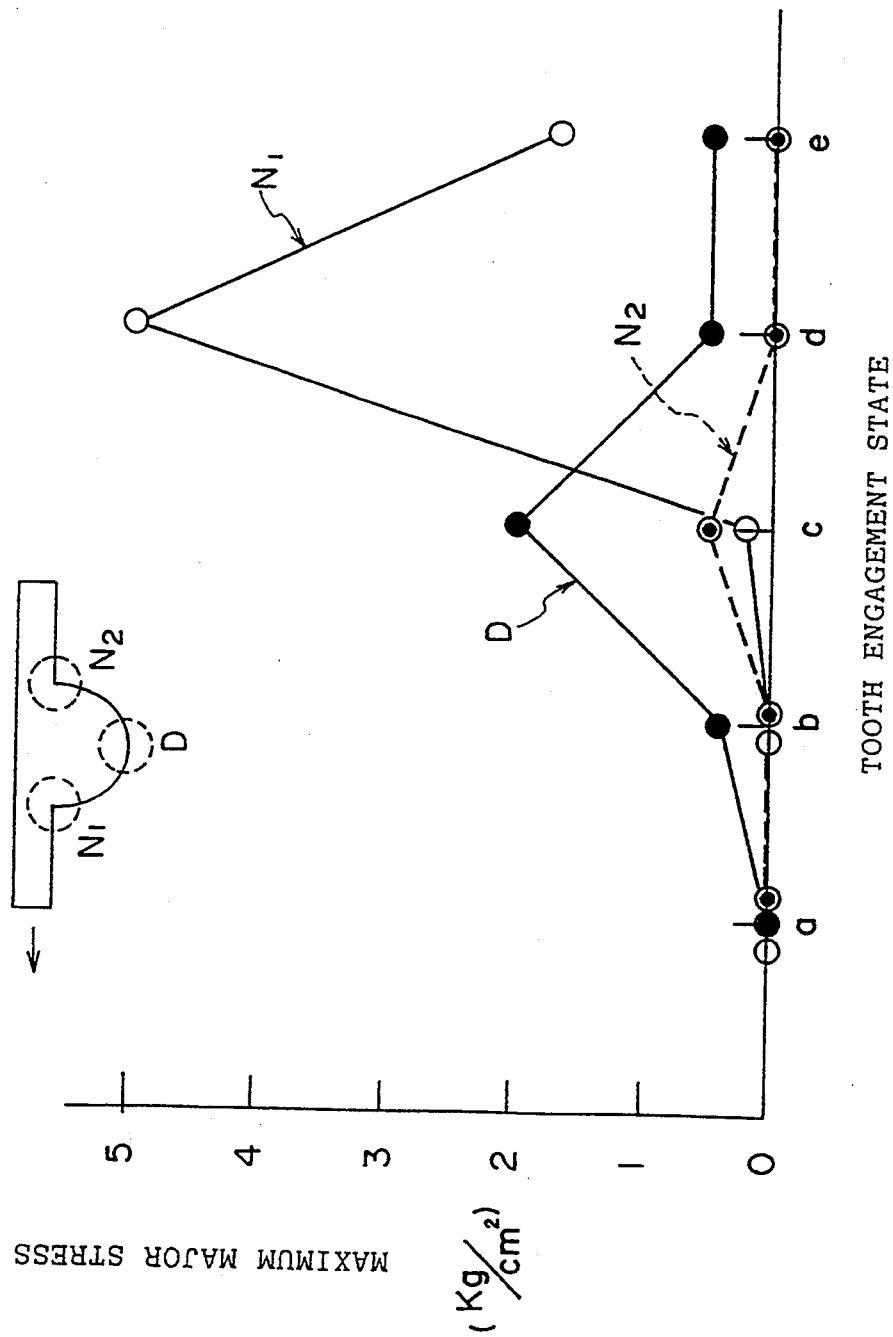

| LINE NO | MAXIMUM MAJOR STRESS (kg/cm²) |
|---|---|
| 1 | -14.5 |
| 2 | -9.7 |
| 3 | -6.6 |
| 4 | -3.4 |
| 5 | -1.6 |
| 6 | -0.2 |
| 7 | 1.3 |
| Max | 2.4 |

| LINE NO. | MAXIMUM MAJOR STRESS (Kg/cm²) |
|---|---|
| 1 | −3.3 |
| 2 | −1.9 |
| 3 | −0.5 |
| 4 | 0.9 |
| 5 | 1.5 |
| 6 | 2.2 |
| 7 | 2.9 |
| 8 | 3.6 |
| 9 | 4.3 |
| Max | 5.0 |

TOOTHED BELT AND TOOTHED BELT-ADAPTED PULLEY

BACKGROUND OF THE INVENTION

1. Field of the Invention

The present invention relates to a toothed belt and, more particularly, to a toothed belt having a plurality of elastic teeth. The toothed belt wraps around a plurality of toothed pulleys so that the elastic teeth of the toothed belt engage the teeth of the toothed pulleys so as to transfer motion. Reduced localized concentration of stress and increased durability are thereby provided. The present invention further relates to a toothed belt-adapted pulley having a plurality of teeth with the toothed belt wrapped therearound. More particularly, it relates to a toothed belt-adapted pulley having increased durability, which provides reduced localized concentration of stress on the toothed belt.

2. Description of the Related Art

Conventionally, in a commonly used toothed belt, trapezoidal elastic teeth were equal or smaller in height than the tooth spaces of a pulley. In a toothed belt-adapted pulley for use in combination with the toothed belt, the depth of each tooth space of the pulley was equal to or greater than the tooth height of the toothed belt. In such a combination of the toothed belt and the toothed belt-adapted pulley, the toothed belt has problems in which: (1) stress concentration occurs at dedendum portions when tooth portions are subjected to shearing stresses; (2) interference is likely to occur when the tooth tip portions and the pulley are brought into and out of engagement with one another; and, (3) during engagement, a localized bend will occur in tensile cords which is affixed to the belt. As a result, belt life is decreased, and transferable loads are limited to within a small range.

In order to overcome the above problems, various toothed belts having improved tooth profiles have been proposed, and further, have been commercialized. For example, Japanese Examined Patent Publication Nos. 56-29141, and 57-51589 describe a toothed belt, in which elastic teeth have a height greater than the depth of the tooth spaces of the pulleys so that tip portions of the elastic teeth are pressed against bottom portions of the pulley tooth spaces during engagement. This pressing effect reduces localized deformation (or maximal curvature) of tensile cords that remains affixed to bottom portions of the elastic teeth. The toothed belt enables the smooth arcuate formation of tensile cords portion during engagement with the pulleys. This prevents localized bending of the tensile cords when the toothed belt is engaged with the pulleys. Belt life is also increased. Further, Japanese Examined Patent Publication Nos. 52-20629, 57-1714, and 56-37457 teach a technique for providing a belt having a high-load capacity, low noise, and long life, in which elastic teeth are formed into an arcuate pattern so as to prevent the occurrence of stress concentration and strain on dedendum portions in a manner similar to the trapezoidal teeth. (In addition, according to embodiments and related commercial goods, the elastic teeth have a height greater than the depth of the tooth spaces of the pulleys to be engaged therewith. This configuration aids in pressing the tooth tip portions against the bottom portions of the pulley tooth spaces in a manner similar to the aforesaid related art.)

The above-described techniques have improved the shortcomings of trapezoidal teeth. In the former reference, however, a strong bending still remains although the localized bending of the belt tensile cords is partially attenuated. In addition, concentration of stress on the dedendum portions cannot be successfully prevented. In latter reference, the elastic teeth have an arcuate pattern, but the dedendum portions are the same as the conventional dedendum portions. As a result, stress concentration on the dedendum portions is attenuated to some extent during engagement off the belt with the pulleys; however, the resulting effectiveness is still insufficient. In either case, the use of the elastic teeth for long periods of time results in cracks in the dedendum portions, and belt durability has been insufficient.

An object of the present invention is to provide a toothed belt having usability under high loads, with high durability, and reduced noise, and in which localized bending of the belt tensile cords as well as stress concentration and strain on dedendum portions are prevented through improvements in the form of the elastic teeth of the toothed belt and similar improvements in the pulleys which accommodate the elastic teeth. A further object of the present invention is to provide a toothed belt having the aforesaid high durability and reduced noise, in which no skipping occurs, even under high loads.

Another object of the present invention is to provide a newly shaped, toothed belt-adapted pulley, which is used with the aforesaid improved toothed belt to be engaged therewith. The pulley minimizes interference when being driven into and out of engagement with the toothed belt, thereby allowing smooth engagement therewith. A still further object of the present invention is to provide a combination of the newly shaped, toothed belt-adapted pulley and the toothed belt having high durability, in which reduced vibration and low noise are achieved, and smooth engagement is provided without skipping under high loads.

SUMMARY OF THE INVENTION

A first invention related to the present application provides a toothed belt wrapped around a plurality of toothed pulleys and having a plurality of elastic teeth engaged with teeth of the pulleys, the toothed belt characterized in that: the toothed belt has tensile cords and a back rubber portion; a tooth depth of the elastic tooth is equal to or less than a depth of each tooth space of the pulleys which have the toothed belt wrapped therearound; a dedendum portion of the elastic tooth has a substantially curvilinear cross-section; and, assuming that in cross-section of the elastic tooth, an overall peripheral length of the elastic tooth at one pitch and a length of a linear portion at the dedendum portion are $m_0$ and $m_1$ respectively, $m_1/m_0$ is 0.1 or less.

A second invention related to the present application provides a toothed belt-adapted pulley which has a plurality of teeth, and around which a toothed belt is trained, the toothed belt having a plurality of elastic teeth, of which root portions have substantially curvilinear cross-sections, the toothed belt-adapted pulley characterized in that: an addendum portion of the tooth of the pulley has a curvilinear cross-section; a depth of each tooth space of the pulley is equal to or greater than a tooth depth of the elastic tooth to be engaged therewith; and, assuming that in cross-section of the tooth of the pulley, an overall peripheral length of the tooth of the pulley at one pitch and a length of an intersection of the addendum portion, at which a tip circle intersects, are $n_0$ and $n_1$ respectively, $n_1/n_0$ is 0.1 or less.

Further, a third invention related to the present application is concerned with, in combination, a toothed belt wrapped around a plurality of toothed pulleys and having a plurality of elastic teeth which engage with teeth of the pulleys, a tooth depth of the elastic tooth being equal to or less than a depth of each tooth space of the pulleys which have the toothed belt wrapped therearound, a dedendum portion of the elastic tooth having a substantially curvilinear cross-section, and a toothed belt-adapted pulley which has a plurality of teeth, and around which the toothed belt is trained, an addendum portion of the tooth of the pulley having a curvilinear cross-section, a depth of each tooth space of the pulley being equal to or greater than the tooth depth of the elastic tooth to be engaged therewith.

The toothed belt according to the present invention includes the elastic teeth, of which tooth portions are elastic bodies. The elastic bodies are positioned on the back rubber portion and the tensile cords. The tooth depth of the elastic tooth is equal to or less than a depth of each tooth space of the pulleys which have the toothed belt wrapped therearound. The dedendum portion of the elastic tooth has a substantially curvilinear cross-section. Assuming that in cross-section of the elastic tooth, the overall peripheral length of the elastic tooth at one pitch and the length of the linear portion at the dedendum portion are $m_0$ and $m_1$ respectively, $m_1/m_0$ is at most 0.1. This structure increases R (radius of curvature) of curvilinear areas at the dedendum portions of the elastic teeth. Concentration of stress on the dedendum portions is thereby allowed to be attenuated. As a result, strain, which results from tip portions of the elastic teeth being thrust against the tooth spaces of the pulley, are avoided at the time of engagement with the pulleys. Further, a layer of the elastic body having enough thickness and length is provided between a tooth fabric and the tensile cords. This arrangement precludes localized stress from being applied to the tensile cords, and provides good bonding between the tooth fabric and the tensile cords. As a result, a toothed belt having increased durability and usability under high loads is achievable, which can prevent the occurrence of cracks and localized bending of the tensile cords, which result from stress concentration. Since the above structure increases the flexural rigidity of the entire toothed belt, skipping is likely to occur when the toothed belt is subjected to high loads. However, when the back rubber portion and the elastic tooth portions are formed from raw materials having the same rigidity, $h_2/h_0$ is set to be at most 0.5 on the assumption that the tooth depth of the elastic tooth and the thickness of the back rubber portion are $h_0$ and $h_2$ respectively. The rigidity of the entire toothed belt is thereby balanced with a height of the tooth portions. As a result, skipping can be prevented.

The toothed belt-adapted pulley according to the present invention is equally suited for use with aforesaid elastic teeth. The addendum portion of the pulley tooth has a curvilinear cross-section. The depth of the tooth space of the pulley is equal to or greater than the tooth depth of the elastic tooth. Assuming that in cross-section of the pulley tooth, the overall peripheral length of the pulley tooth at one pitch and the length of the intersection of the addendum portion, at which the tip circle intersects, are $n_0$ and $n_1$ respectively, $n_1/n_0$ is at most 0.1. The above configuration can provide smooth engagement of the pulley with the elastic teeth of the toothed belt, the elastic teeth being provided with a large R (radius of curvature) of the curvilinear areas at the dedendum portions. As a result, a combination of the toothed belt, which has a high-load capacity and improved durability, and the toothed belt-adapted pulley is achievable.

BRIEF DESCRIPTION OF THE DRAWINGS

FIG. 15 is a graph, illustrating variations in maximum major stresses between the engagement states of FIGS. 14A through 14E, the maximum major stresses being applied to a dedendum portion $N_1$, a tooth tip point D, and a dedendum portion $N_2$ of a present invention product 1;

FIG. 16 is a graph, illustrating variations in maximum major stresses between the engagement states of FIGS. 14A through 14E, the maximum major stresses being applied to a dedendum portion $N_1$, a tooth tip point D, and a dedendum portion $N_2$ of a reference product 1.

DETAILED DESCRIPTION OF THE PREFERRED EMBODIMENTS

The present invention will now be described in greater detail.

Figure 1:
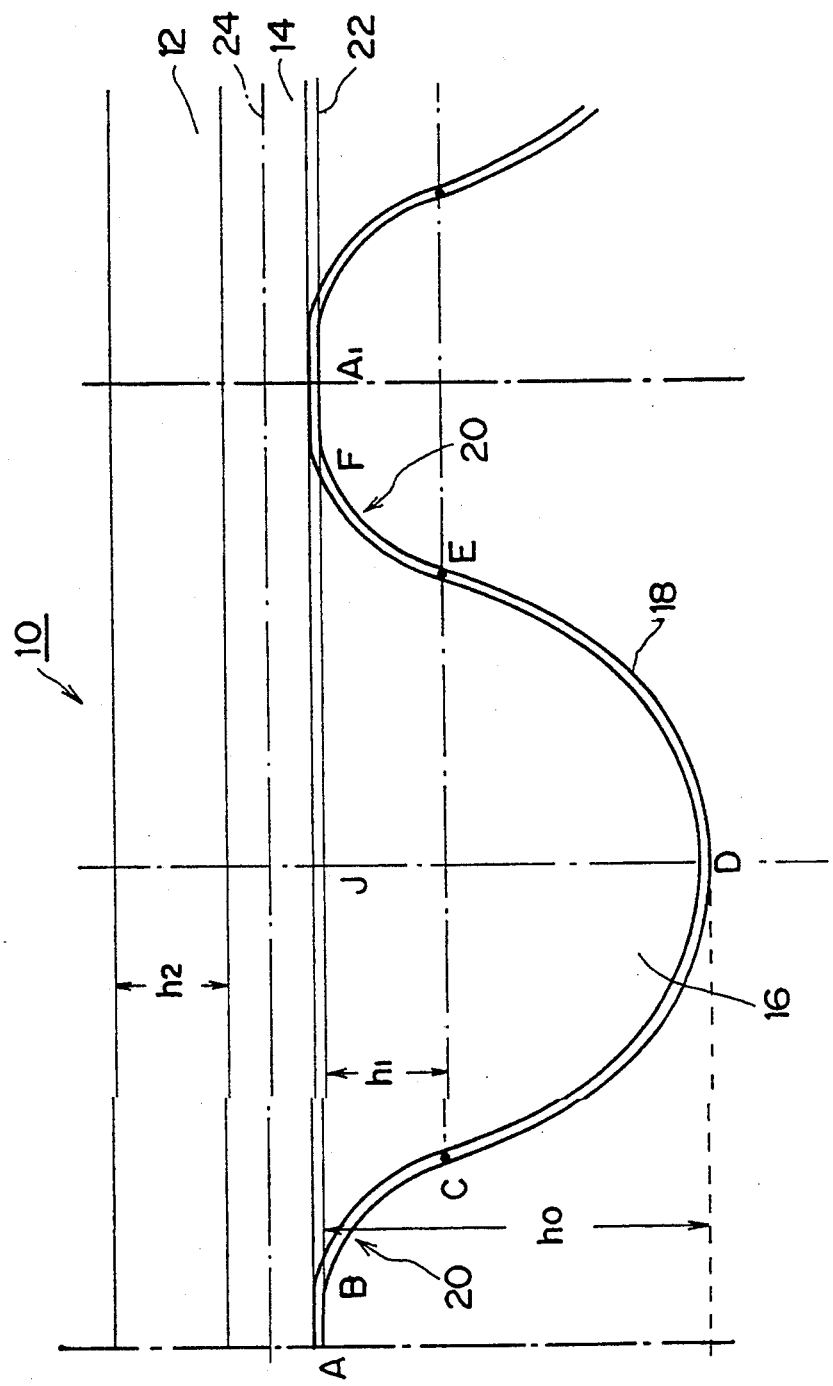
FIG. 1 is an enlarged cross-sectional view, illustrating a toothed belt according to the present invention.

FIG. 1 is an enlarged cross-sectional view, showing a toothed belt according to the present invention.

A pitch of an elastic tooth 10 is represented by a section which is separated by heavy, alternate long-and-short dash lines in FIG. 1, i.e., a region which extends along a curve from points A to $A_1$ through a point D. The elastic tooth 10 includes a back rubber portion 12, a tensile cord 14, an addendum portion 16, a dedendum portion 20, and a tooth fabric 18 that covers a surface of the elastic tooth 10. More specifically, the addendum portion 16 represents a region which extends between inflection points C and E through the tooth tip point D. The dedendum portion 20, more specifically, corresponds to: a region which extends between the point A and the inflection point C though a point B; and, a region which extends between the inflection point E and the point $A_1$ through a point F. These regions have substantially curvilinear cross-sections, and include few linear portions that correspond to tooth root portions. There is a straight line which passes through surface portions of the tooth fabric 18 at the tooth root portions of the dedendum portions 20, the tooth fabric 18 being sealingly positioned on the tensile cord 14. The straight line is referred to as a land line 22. Next, assuming that a height of the elastic tooth 10, i.e., a distance between the land line 22 and the tooth tip point D is $h_0$, a tooth depth (a tooth tip height) $h_0$ must be equal to or less than the depth of each tooth space of the pulleys which have the toothed belt wrapped therearound. "The depth of the tooth space of the pulley", as given herein, means a distance between the tooth tip point at a distal end portion of a pulley tooth and the tooth root portion at the deepest level of the pulley tooth space. In other words, the above term refers to a distance between a tip circle and a root circle of the pulley. The tip circle is centered at a revolving shaft of the pulley, and extends through the tooth tip point of the pulley tooth. The root circle is centered at the revolving shaft of the pulley, and extends through the tooth root portion of the pulley. In the substantially curvilinear dedendum portion 20, it is only necessary that most of the respective regions between A and C and between E and $A_1$ are curvilinear. Thus, it is more desirable that a linear root portion between A and B and a linear root portion between F and $A_1$ are smaller in length. Further, it is preferred that in cross-section of the dedendum portion 20, the dedendum portion 20 contacts the tensile cord 14 only at the tooth root points A and $A_1$. It is still more desirable that respective curvilinear dedendum portions between B and C and between E and F, both of which correspond to a base portion of the elastic tooth 10, have a large radius (R) of curvature.

In a cross-section of the elastic tooth 10, assume that an overall peripheral length of the elastic tooth 10 at one pitch, i.e., a length of the curve defined by A B, C, D, E, F, and $A_1$, is, for example, $m_0$. Further, assume that a total length of the respective linear root portions between A and B and between F and $A_1$ at the dedendum portion 20 is $m_1$. Then, $m_1/m_0$ is preferably 0.1 or less, and more preferably, 0.05 or less. It is even more desirable for $m_1/m_0$ to be zero, which means that the dedendum portion 20 has an entirely curvilinear profile which is free of any linear portions. When $m_1/m_0$ exceeds 0.1, there is no other way but to decrease the radius (R) of curvature at the dedendum portion 20, which undesirably results in an increased concentration of stress on the dedendum portion 20.

Figure 2:
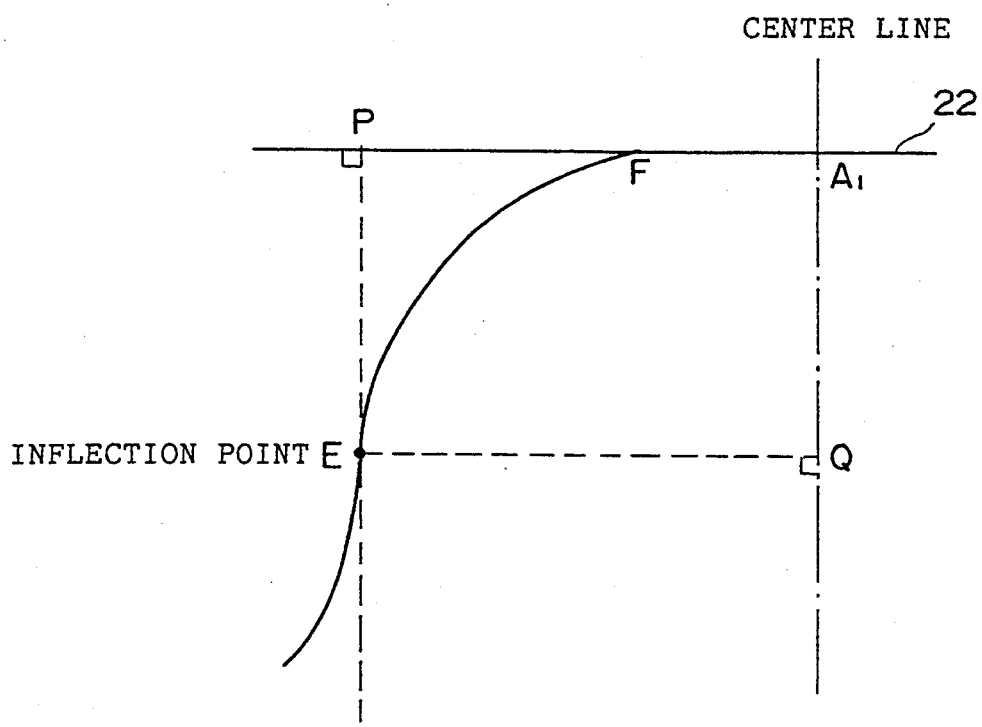
FIG. 2 is an enlarged cross-sectional view, illustrating a dedendum portion of the toothed belt of FIG. 1.

FIG. 2 is an enlarged cross-sectional view, illustrating the dedendum portion 20 of the toothed belt of FIG. 1.

In order to explain a large radius (R) of curvature, assume that a line, which extends in a direction perpendicular to the land line 22 through the tooth root point $A_1$ at the dedendum portion 20, and a line, which extends in a direction parallel to the land line 22 through the inflection point E, intersect at a point Q. Further, assume that a line, which extends in a direction perpendicular to the land line 22 through the inflection point E, and the land line 22 intersect at a point P. Then, a triangle is defined by P, E, and F, while a quadrilateral is defined by P, E, Q, and $A_1$. A large radius (R) of curvature means that an area ratio <R> of the triangle to the quadrilateral is equal to or greater than 0.15. The area ratio <R> is preferably equal to or greater than 0.17, and more preferably, at least 0.20.

Further, it is desirable that a cross-sectional shape of the toothed belt according to the present invention has the following features in which: the elastic tooth at one pitch is formed by a smooth chain of arc portions which have two or more different radiuses, or more preferably, three or more different radiuses.

Assuming that the tooth depth (i.e., the distance between the land line 22 and the tooth tip point D) is $h_0$, and that a distance between the land line 22 and the inflection point C is $h_1$, $h_1/h_0$ preferably lies within the range of 0.2 to 0.5, more preferably, within the range of 0.25 to 0.5, and still more preferably lies within the range of 0.28 to 0.4.

Figure 3:
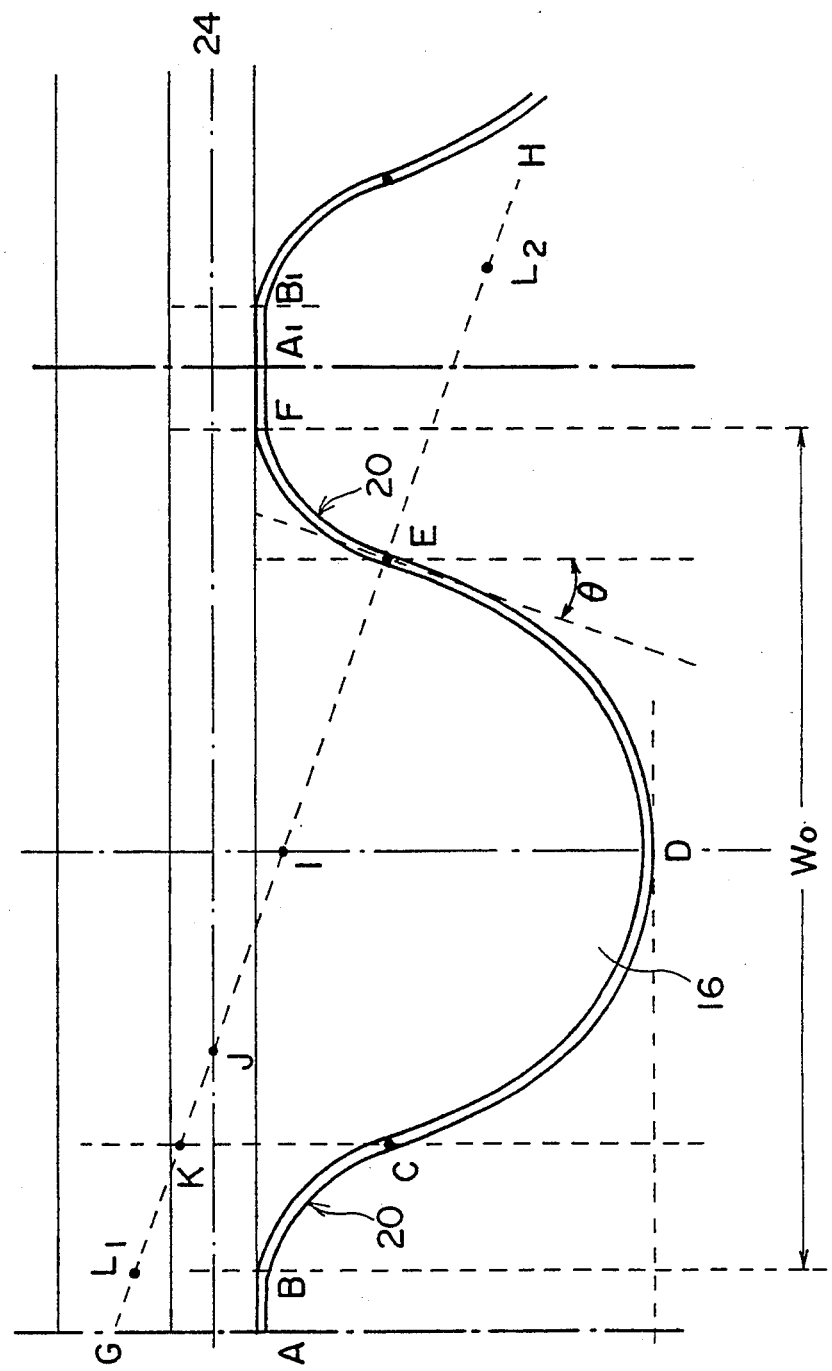
FIG. 3 is a cross-sectional view corresponding to FIG. 1, but with an auxiliary line being added thereto.

FIG. 3 is a cross-sectional view, showing the toothed belt according to the present invention, in which an auxiliary line is given.

In the toothed belt according to the present invention, assume that an angle defined between a tangent, which extends through the inflection point E, and a line, which extends in a direction perpendicular to a pitch line 24 through the inflection point E, the pitch line 24 being a center line of the tensile cord 14, is $\theta$. The degree of the angle $\theta$ is preferably within the range of 5° to 30°. A more preferred angle $\theta$ lies within the range of 5° to 25°. An angle within the range of 8° and 23° is still more preferred. When a straight line between G, E, and H is drawn through the inflection point E in a direction perpendicular to the tangent that passes through tile inflection point E, the following curves are formed by part of arc portions which are centered at arbitrary points ($L_1$ and $L_2$) on the respective perpendicular lines between G and E and between E and H: a curve which extends through the point E, and forms a part or complete curvilinear profile of the addendum portion 16; and, a curve which extends through the point E, and forms a part or complete curvilinear profile of the dedendum portion 20. Next, assume that the perpendicular line of G to E intersects the following at respective points I, J. and K: a perpendicular line, which extends from the tooth tip point D at the addendum portion 16 to the pitch line 24; the pitch line 24; and, a perpendicular line, which extends from the inflection point C to the pitch line 24. Further, assume that the arc portion on the perpendicular line of G to E is centered at $L_1$. Then, a radius length $L_1$ to E of the arc portion must be equal to or greater than a length of I to E. More preferably, the length of $L_1$ to E is equal to or greater than a length of J to E, and is still more preferably equal to or greater than a length of K to E.

In order to prevent a sharp bending of the dedendum portion 20, it is desirable to provide an optimum ratio between the tooth depth $h_0$ and a tooth width. To this end, assuming that in FIG. 3, the dedendum portion 20, which has the inflection points C and E of the elastic tooth 10 located at end portions thereof, and the linear portions, which Form the tooth root portions, intersect at the points B and F, a distance $w_0$ between B and F can be a measure of the tooth width. In the present invention, it is desirable that a ratio between the tooth depth $H_0$ and the tooth width $w_0$, i.e., $h_0/w_0$, lies within the range of 0.35 to 0.75. More preferably, the ratio is within the range of 0.35 to 0.70, and still more preferably, within the range of 0.38 to 0.6.

The toothed belt having a tooth shape according to the present invention is constructed in the above-described manner. This structure greatly decreases localized stress which would occur in the belt when the belt engages the pulleys. A toothed belt having an increased load capacity and improved durability is thereby achievable.

In addition to the above benefits, another object of the present invention is to provide a toothed belt for high-load use, which does not skip when high loads are applied thereto. It is well known that an increase in the load or flexural rigidity of the entire belt increases the likelihood of the toothed belt skipping. In the toothed belt according to the present invention, the dedendum portion 20 has a substantially curvilinear cross-section. Accordingly, an elastic body portion placed on the tensile cords 14 is large in thickness, which tends to increase the flexural rigidity of the entire belt. In order to decrease the flexural rigidity of the entire belt, thickness of the back rubber portion 12 must be made smaller. In this case, when the back rubber portion 12 and the addendum portion 16 are formed from the same raw elastic body material, assume that the thickness of the back rubber portion 12 is $h_2$. Then, a ratio of the thickness $h_2$ of the rubber portion 12 to the tooth depth $h_0$, i.e., $h_2/h_0$, must be 0.5 or less. $h_2/h_0$ is preferably 0.45 or less, more preferably, 0.40 or less, and still more preferably 0.37 or less. When the raw material forming the back rubber portion 12 differs in flexural rigidity from that of the addendum portion 16, for example, when the raw material of the former has lower flexural rigidity than that of the latter, the thickness $h_2$ of the back rubber portion 12 must be greater than the preceding expressions. In a converse case, the thickness $h_2$ must be, of course, smaller than the aforesaid limitations.

Figure 4:
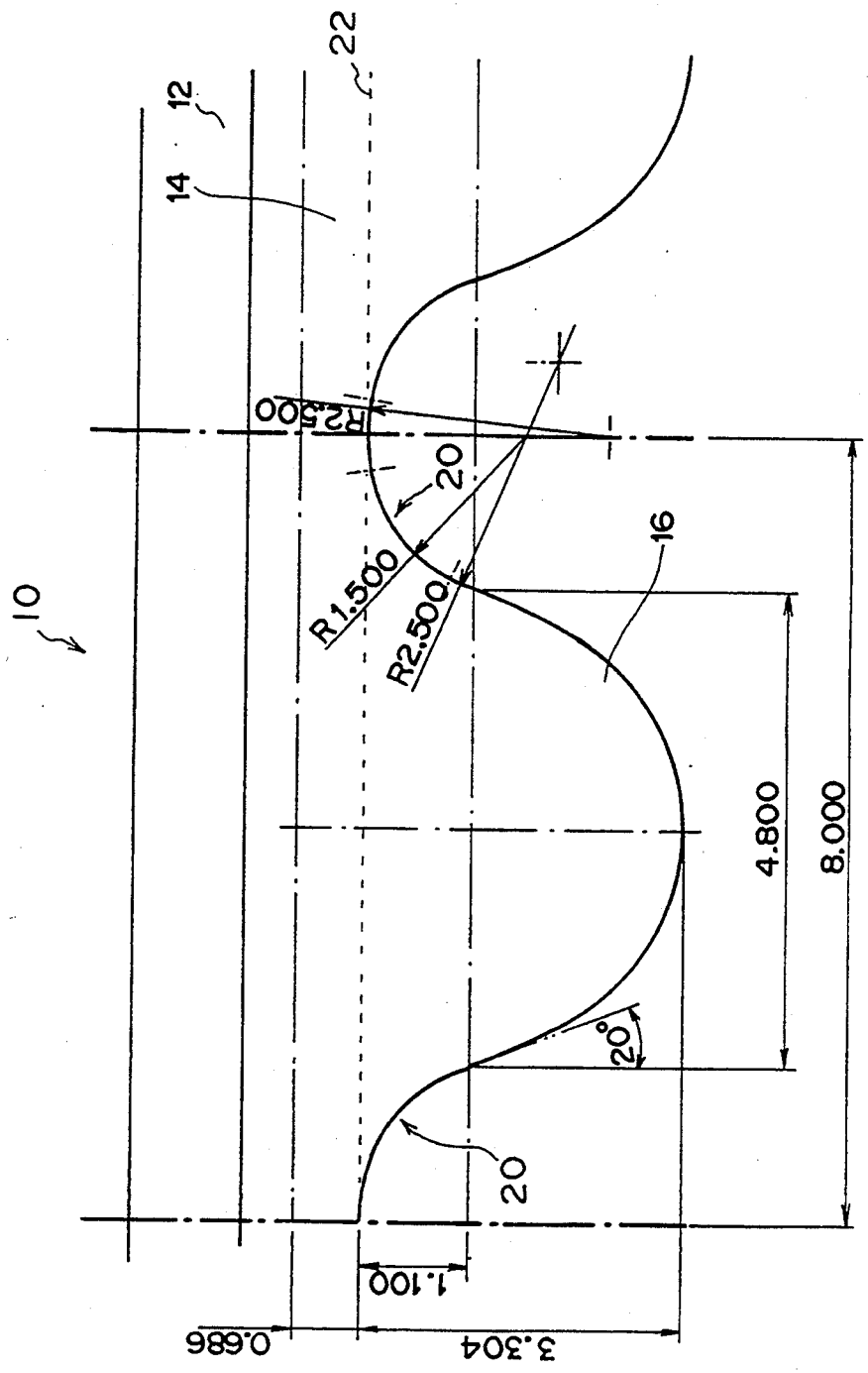
FIG. 4 is an enlarged cross-sectional view, illustrating another aspect of the toothed belt according to the present invention.

FIG. 4 is an enlarged cross-sectional view, illustrating another toothed belt according to the present invention.

In this embodiment, dedendum portions 20 have entirely curvilinear cross-sections.

Next, materials used for the toothed belt according to the present invention will be described.

As raw materials for a tooth fabric material, filament yarn and spun yarn, such as nylon fibers, polyester fibers, polyvinyl alcohol synthetic fibers, viscose rayon, aromatic polyamide fibers, cotton, and the like, or blended yarn or mixed and twisted yarn, in which more than two types of the above fibers of raw materials are blended or mixed and twisted, are used as textured yarn. Canvas formed as woven fabrics, which include, for example, a plain weave, a twill weave, a sateen weave, and the like, is preferably used. As another usable canvas, there is one in which crimped nylon yarn and non-extensible yarn, each processed with a woolly finish, are formed as the weft and the warp respectively.

Next, rubber materials, thermoplastic elastomers, thermosetting elastomers, and the like may be named as the raw materials for the elastic tooth and the back rubber portion.

Further, as the rubber materials, the following may be chosen: hydrogenated nitrile rubber (H-NBR); chloroprene rubber (CR); chlorosulphonated polyethylene (CSM); acrylic rubber (ACM, ANM); natural rubber (NR); polyisoprene rubber (IR); polybutadiene rubber (BR); 1, 2-polybutadiene (1, 2-BR); styrene-butadiene rubber (SBR); nitrile rubber (NBR); isobutylene-isoprene rubber (IIR); halogenated isobutylene-isoprene rubber (X-IIR); ethylene propylene rubber (EPM, EPDM); chlorinated polyethylene (CM); epichlorohydrin rubber (CO, EGO); silicone rubber (Q); fluoroelastomer (FKM); urethane rubber (U); polysulfide rubber (T); ethylene acrylic rubber; phosphazene rubber; ethylene-vinylacetate-acrylic ester rubber; polynorbornene rubber; and the like. The above materials may be used individually or in combination.

The above rubber materials may contain commonly-used compounding agents for rubber materials, when desired, such as a curing agent, a vulcanization accelerator, and an antioxidant. For fillers, softeners, plasticizers, tackifiers, oil, oligomers, and lubricants, all of which may be combined with the above rubber materials, the following may be named:

(1) filler: scale-like inorganic fillers, such as clay, diatomaceous earth, carbon black, silica, talc, barium sulfate, calcium carbonate, magnesium carbonate, metal oxide, mica, graphite, aluminum hydroxide, and the like; particulate or powder-shaped solid fillers, such as various metallic powder, chips of wood, glass powder, ceramic powder, particulate or powder-shaped polymers; and, other various fillers for rubber or resin, such as natural or artificial monofilaments and filaments (for example, straw, hair, glass fibers, metallic fibers, and other various polymer fibers).

A preferred compounding ratio of the filler to the rubber by weight is from 30 to 200: 100.

(2) softener: various softeners for rubber or resin, which include aromatic hydrocarbon, naphthene, paraffin, and the like.

A typical compounding ratio of the softener to the rubber by weight is, for example, 150 or less: 100. When the compounding ratio exceeds 150, mixing cannot be carried out by a normal kneading method.

(3) plasticizer: plasticizers which include various ester, such as phthalic acid ester, esters of derivative of phthalic acid, aliphatic dibasic acid ester, glycol ester, fatty acid ester, phosphate, stearic acid ester, and the like; epoxide plasticizers; and, other plasticizers for plastics or NBR, the latter plasticizers including phthalate, adipate, sebacate, phosphate, polyether, polyester, and the like.

A typical compounding ratio of the plasticizer to the rubber by weight is, for example, 150 or less: 100. When the compounding ratio exceeds 150, mixing cannot be carried out by a normal kneading method.

(4) tackifier: various tackifiers, such as cumarone resin, cumarone indene resin, phenol resin, terpene resin, petroleum hydrocarbon, rosin derivatives, and the like.

A typical compounding ratio of the tackifier to the rubber by weight is, for example, 50 or less: 100. A compounding ratio above 50 results in a considerable increase in tackiness, which is undesirable for processability reasons.

(5) oligomer: various oligomers, such as crown ether, fluorine-containing oligomer, polybutene, xylene formaldehyde resin, chlorinated rubber, polyethylene wax, petroleum resin, rosin ester rubber, polyalkylene, glycol diacrylate, liquid rubber (polybutadiene, styrene-butadiene rubber, acrylonitrile-butadiene rubber, polychloroprene, and the like), silicone oligomer, poly-$\alpha$-olefin, and the like.

A typical compounding ratio of the oligomer to the rubber by weight is, for example, 100 or less: 100. A compounding ratio above 100 precludes mixing by any normal kneading method.

(6) lubricant: various lubricants which follow: hydrocarbon lubricants, such as paraffin and wax; fatty acid lubricants, such as higher fatty acid and oxyfatty acid; fatty acid amide lubricants, such as fatty acid amide and alkylene bis fatty acid amide; ester lubricants, such as fatty acid lower alcohol ester and fatty acid polyglycol ester; alcohol lubricants, such as fatty alcohol, polyhydric alcohol, polyglycol, polyglycerol; metal soap; mixed lubricants; and the like.

A typical compounding ratio of the lubricant to the rubber by weight is, for example, 50 or less: 100. A compounding ratio above 50 precludes mixing by a normal kneading method.

As the thermoplastic elastomers, the Following may be chosen: styrene elastomers; vinyl chloride elastomers; olefin elastomers; polyester elastomers; polyamide elastomers; thermoplastic polyurethane elastomers; and the like.

For the thermosetting elastomers, thermosetting polyurethane elastomers may be named. Liquid polyurethane elastomers used for toothed belts, i.e., castable polyurethane elastomers, include one-shot method-based polyurethane elastomers and prepolymer process-based polyurethane elastomers. The prepolymer process-based polyurethane elastomers among the above materials are widely used because of having better physical properties. The prepolymer process-based polyurethane elastomers can be molded by a vacuum-forming method, a centrifugal-forming method, and the like. By way of illustrative example of the prepolymer process-based polyurethane elastomers, thermosetting urethane elastomers and the like may be given, which are hardened by a step in which a polyester polyol or polyether polyol and a prepolymer at a terminal end (—NCO) of di-isocyanate are chain-lengthened and cross-linked by means of one of a diamine compound and a polyol (polyhydric alcohol) compound, or using a plurality of curing agents. If necessary, the following fillers may be dispersed into the thermosetting urethane elastomers: scale-like inorganic fillers, such as clay, diatomaceous earth, carbon black, silica, talc, barium sulfate, calcium carbonate, magnesium carbonate, metal oxide, mica, graphite, aluminum hydroxide, and the like; particulate or powder-shaped solid fillers, such as various metallic powder, chips of wood, glass powder, ceramic powder, particulate or powder-shaped polymers; and, other various fillers for rubber or resin, such as natural or artificial monofilaments and filaments (for example, straw, hair, glass fibers, metallic fibers, and other various polymer fibers).

Next, a toothed belt-adapted pulley according to the present invention will be described in greater detail.

Figure 5:
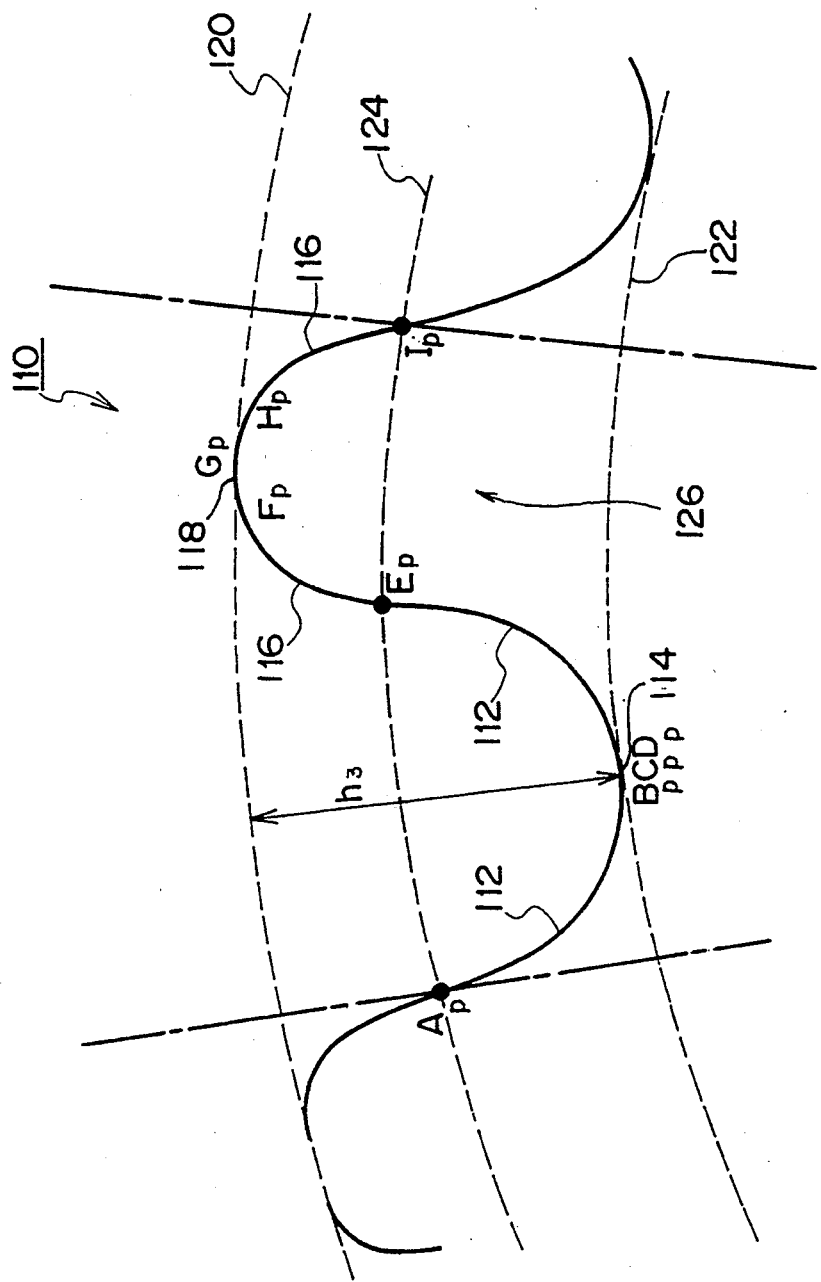
FIG. 5 is an enlarged cross-sectional view, illustrating a toothed belt-adapted pulley according to the present invention.

FIG. 5 is an enlarged cross-sectional view, showing the toothed belt-adapted pulley.

A pitch of a pulley tooth 126 is represented by a section which is separated by alternate long-and-short dash lines. The pulley tooth 126 includes a dedendum portion 112, a tooth root portion 114, an addendum portion 116, and a tooth tip portion 118. More specifically, the addendum portion 116 represents a region which extends between inflection points $E_p$ and $I_p$ through a tooth tip point $G_p$. The region has a curvilinear cross-section, and includes few portion intersections at which a tip circle 120 intersects, the intersection corresponding to the tooth tip portion 118. The dedendum portion 112, more specifically, corresponds to: a region which extend between an inflection points $A_p$ and the inflection point $E_p$ through a point $C_p$. The region, which extends between the inflection points $A_p$ and $E_p$ through the point $B_p$, a tooth root point $C_p$, and the point $D_p$, may be formed into a trapezoidal or arcuate shape. A portion extending between the inflection points $A_p$ and $E_p$ through the tooth root point $C_p$ is called a tooth space. A depth of the tooth space of the pulley tooth 126 represents a distance between the tip circle 120 and a root circle 122 in relation to a perpendicular line from a revolving shaft of the pulley. The tip circle 120 and the root circle 122 are centered at the revolving shaft of the pulley, but the former extends through the tooth tip point $G_p$ at the addendum portion 116, while the latter extends through the tooth root point $C_p$ at the dedendum portion 112. Assuming that the above-identified distance is $h_3$, a depth $h_3$ of the tooth space must be equal to or greater than a tooth height (i.e., a tooth depth) of a toothed belt to be wrapped around the pulleys. In the curvilinear addendum portion 116, it is only necessary that most of the region between $E_p$ and $I_p$ does not match the tip circle 120. Thus, it is desirable that respective curvilinear addendum portions between $E_p$ and $F_p$ and between $H_p$ and $I_p$, both of which correspond to an end portion of the pulley tooth 126, have a large radius (R) of curvature.

Figure 6:
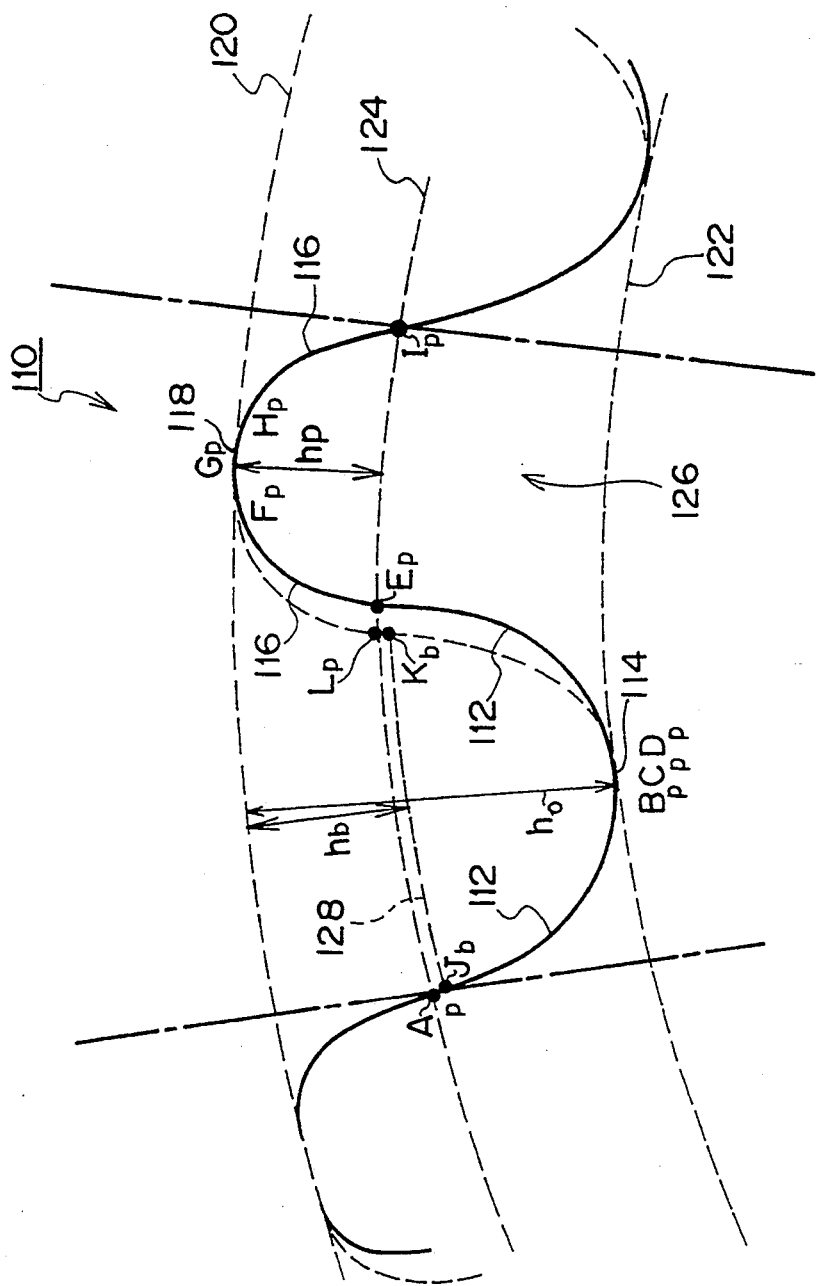
FIG. 6 is an enlarged cross-sectional view, depicting a state in which the toothed belt-adapted pulley according to the present invention is engaged with a toothed belt.

FIG. 6 is an enlarged cross-sectional view, depicting a state in which the toothed belt-adapter pulley according to the present invention is engaged with a toothed belt wrapped therearound. The pulley and the toothed belt are represented by a solid line and a broken line, respectively. Inflection points at a tooth portion of the toothed belt are shown by inflection points $J_b$ and $K_b$. A land line of the toothed belt is coincident with the tip circle 120 of the pulley when the toothed belt is in engagement with the pulley.

In FIG. 6, a concentric circle 124 is centered at the revolving shaft of the pulley, and extends between the pulley tip circle 120 and the pulley root circle 122 through the inflection points $A_p$, $E_p$, and $I_p$ of the pulley. Now, assume that the concentric circle 124 is spaced apart from the pulley tip circle 120 (which is substantially coincident with the land line of the toothed belt to be engaged with the pulley) by a distance $h_p$ (which is a difference in a radius from the revolving shaft of the pulley). Further, a concentric circle 124 is centered at the revolving shaft of the pulley, and extends along the pulley tip circle 120 through the inflection points $J_b$ and $K_b$ at the tooth portion of the toothed belt. Now, assume that the concentric circle 124 is spaced apart from the pulley tip circle 120 by a distance $h_b$ (which is a difference in the radius from the revolving shaft of the pulley). When $Q_p$ is defined by the following equation, $-0.3 \leq Q_p \leq 0.5$ is desirable, and $-0.2 \leq Q_p \leq 0.3$ is more preferred:

$$Q_p = (h_p - h_b)/h_b$$

The above range of $Q_p$ provides smooth engagement and minimal interference between the toothed belt and the pulleys, and further assists greatly in improving belt destruction resistance and the reduction of noise.

In cross-section of the pulley tooth 126, assume that an overall peripheral length of the pulley tooth 126 at one pitch, i.e., a length of the curve defined by $A_p$, $B_p$, $C_p$, $D_p$, $E_p$, $F_p$, $G_p$, $H_p$, and $I_p$, is, for example, $n_0$. Further, assume that a length of an intersection between $F_p$, $G_p$, and $H_p$ at the addendum portion 116, at which the tip circle 120 intersects, is $n_1$. Then, $n_1/n_0$ is preferably 0.1 or less, and is more preferably 0.05 or less. It is still more desirable that $n_1/n_0$ is zero, that is, the entire addendum portion 116 has a curvilinear profile which is entirely different from the tip circle 120. When $n_1/n_0$ exceeds 0.1, there is no other way but to decrease the radius (R) of curvature at the addendum portion 116 of the pulley tooth 126 which is engaged with the dedendum portion of the elastic tooth of the toothed belt. A reduced R results in an increased concentration of stress on the dedendum portion of the elastic teeth of the toothed belt. A reduced R also results in increased interference between the pulley tooth 126 and tile elastic tooth at the time of engagement and disengagement. These are undesirable from the standpoints of toothed belt durability and reduced vibration during belt driving.

The tooth depth of the elastic tooth of the toothed belt is represented by the distance $h_0$ between the land line and the tooth tip point of the elastic tooth. In the toothed belt and the pulley according to the present invention, the depth of the tooth space of the pulley, namely, a difference $h_3$ in the distance from the revolving shaft of the pulley between the tip circle 120 and the root circle 122 of the pulley, must be equal to or greater than the tooth depth $h_0$ of the elastic tooth of the toothed belt.

Further, it is desirable that a cross-sectional shape of the pulley tooth according to the present invention has the following features in which: the tooth at one pitch is formed by a smooth chain of arc portions which have two or more different radiuses, or more preferably, three or more different radiuses.

Next, assume that the previously mentioned concentric circle 124 intersects the addendum or dedendum portion of the elastic tooth of the toothed belt at a point $L_p$ (FIG 6 shows that the concentric circle 124 intersects the dedendum portion 20). Further, assume that arc portions between $A_p$ and $E_p$ and between $A_p$ and $L_p$ on the concentric circle 124 have respective lengths of $r_0$ and $r_1$. When R is defined below as a measure of a magnitude off a backlash between the elastic tooth of the toothed belt and the pulley (the backlash is a gap to be defined when a pair of teeth is engaged with each other), $R \leq 0.20$ is preferred, $R \leq 0.12$ is more preferred, and $R \leq 0.1$ is the most preferred.

$$R = (r_0 - r_1)/r_0$$

The above range of the magnitude of the backlash provides ideal engagement and minimal interference between the toothed belt and the pulleys.

The toothed belt having teeth shaped in accordance with the present invention is constructed in the above-described manner. This structure greatly decreases localized stress which would occur in the belt when the belt is engaged with the pulleys. A toothed belt having a high-load capacity and improved durability is thereby provided.

In addition to the above-described benefits, a further object of the present invention is to provide a toothed belt-adapted pulley adapted for high loads, and which provides smooth engagement so as to not skip under high loads.

Figure 7:
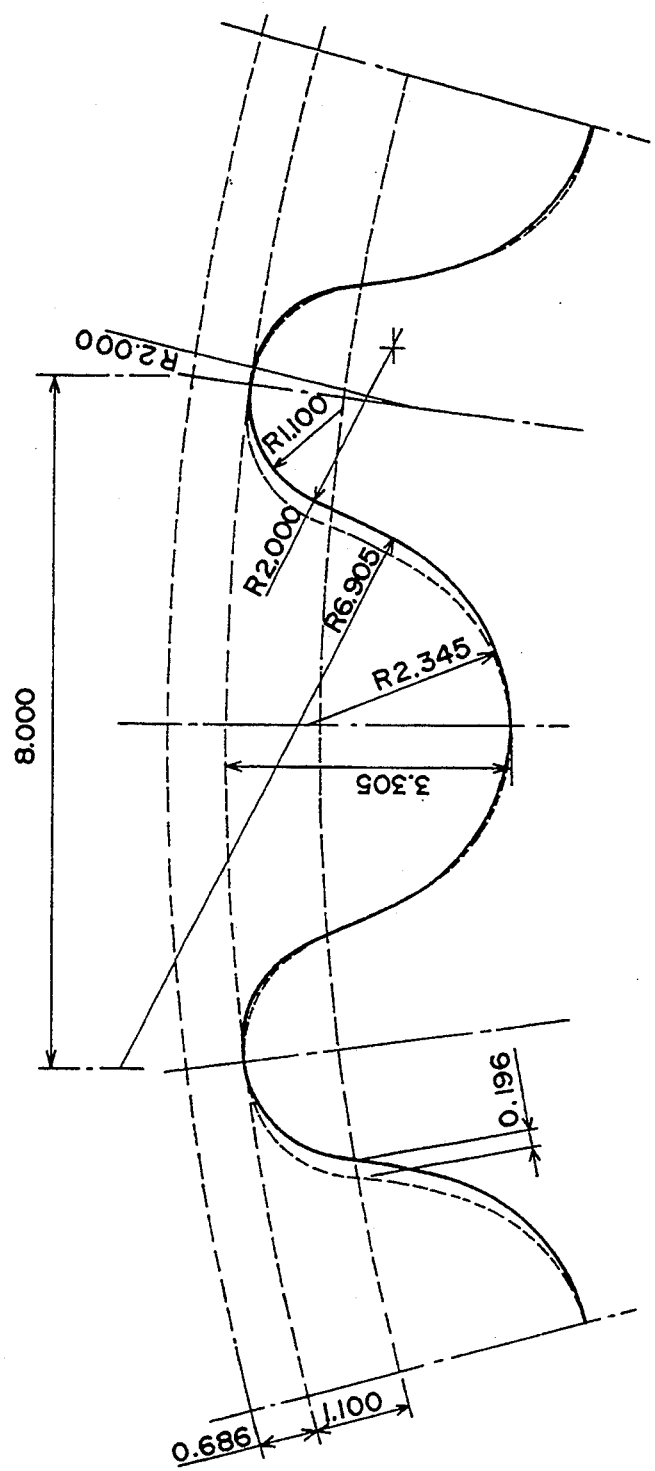
FIG. 7 is an enlarged cross-sectional view, illustrating another aspect of the toothed belt-adapted pulley according to the present invention.
Figure 8A:
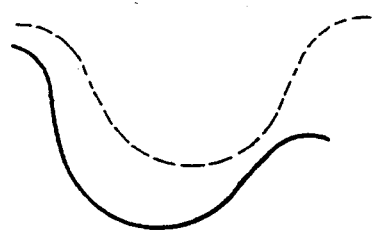
FIGS. 8A through 8D are analytic views, illustrating each state in which the toothed belt-adapted pulley according to the present invention is engaged with an elastic tooth of a toothed belt.
Figure 8B:
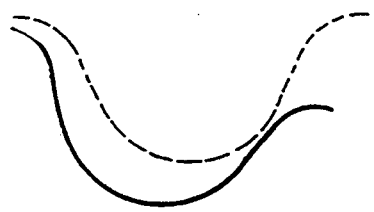
Figure 8C:
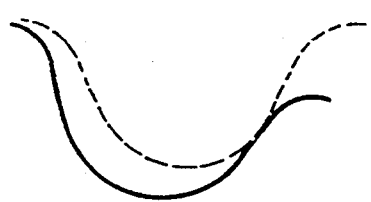
Figure 8D:

FIG. 7 is an enlarged cross-sectional view, illustrating a state in which another toothed belt-adapted pulley according to the present invention is engaged with a toothed belt.

Similar to FIG. 5, cross-sections of the pulley and the toothed belt are represented by a solid line and a broken line, respectively. In the present embodiment, addendum portions 116 of the pulley have curvilinear profiles which are entirely different from a pulley tip circle and, dedendum portions 20 of the toothed belt have curvilinear profiles which are entirely different from the and line 22.

FIGS. 8A through 8D is an analytic view, illustrating states of engagement between the toothed belt-adapted pulley and an elastic tooth of the toothed belt, the pulley and the belt being shown in FIG. 7.

The states of engagement from FIGS. 8A through 8D show how the pulley and the elastic tooth are brought into engagement with each other in stages. In the present embodiment, smooth engagement is even achieved in the engagement states between FIG. 8C and FIG. 8D, and it is obvious that interference between the pulley and the elastic tooth is minimized.

FIGS. 9A through 9D are analytic views, illustrating states of engagement between a toothed belt-adapted pulley and an elastic tooth of a toothed belt, both of which are commercial goods, as shown in Japanese Examined Patent Publication Nos. 52-20629, 57-1714, and 56-37457.

Figure 9A:
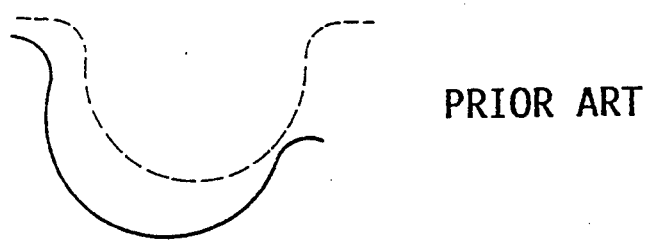
FIGS. 9A through 9D are analytic views, illustrating each state of engagement of a toothed belt-adapted pulley with an elastic tooth of a toothed belt, both of which are commercialized goods.
Figure 9B:
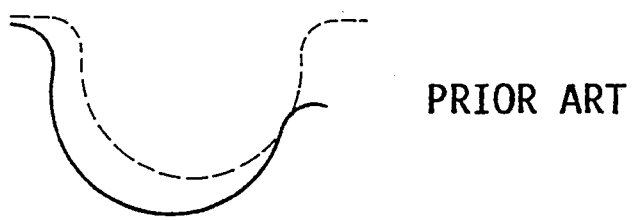
Figure 9C:
Figure 9D:
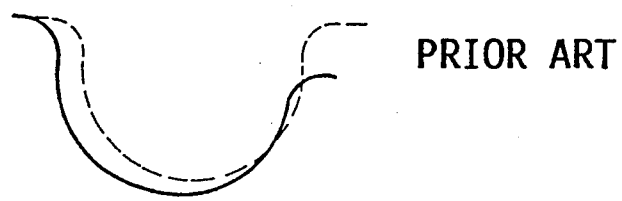

Similar to FIGS. 8A through 8D, the engagement states between FIG. 9A and FIG. 9D show how the pulley and the elastic teeth are driven into engagement in stages. In this example for comparison, interference occurs between the elastic belt teeth and the pulley in the engagement states between FIG. 9C and FIG. 9D.

As evidenced thereby, no smooth engagement is achieved.

The result is that the toothed belt-adapted pulley, which is a product of the present invention, is resistant to interference when being engaged with the toothed belt because smooth engagement therebetween is achieved. This feature presents an improved benefit in which no skipping occurs, even under high loads, and reveals that considerable improvements over conventional products have been achieved.

Experimental Example 1

Figure 10:
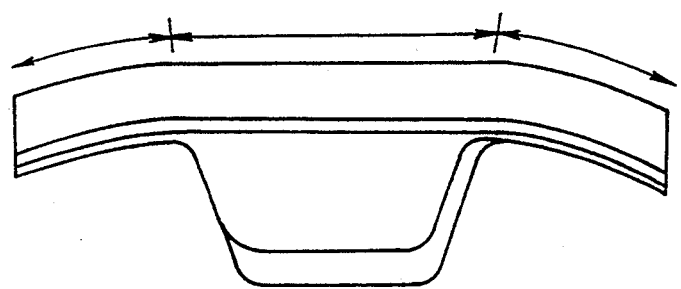
FIG. 10 is a schematic view showing a state of engagement of a conventional toothed belt with a pulley, the toothed belt having trapezoidal elastic teeth.

FIG. 10 is a schematic view, showing a state of engagement of a conventional toothed belt with a pulley, the toothed belt having trapezoidal elastic teeth. Japanese Examined Patent Publication Nos. 56-29141 and 57-51589 show that the aforesaid trapezoidal elastic teeth have a problem of localized bending of tensile cords at dedendum portions resulting from: the tendencies of the tensile cords and a back rubber portion, both of which are located at tooth portions, to assume a bow shape; and, the tendency of the dedendum portions to assume an arcuate shape.

Figure 11A:
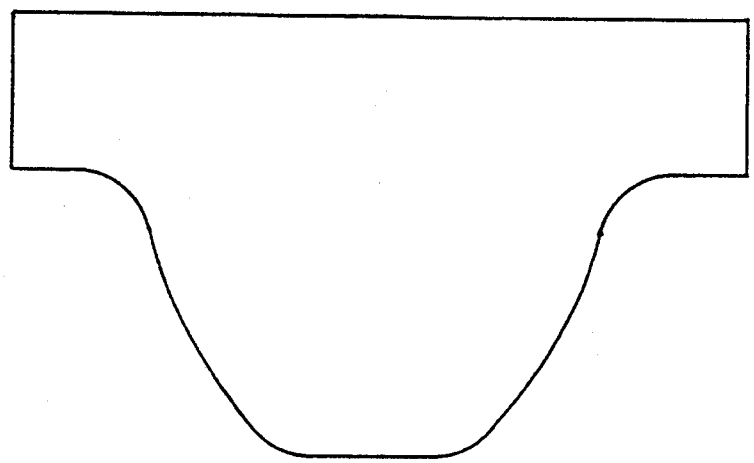
FIG. 11A is an enlarged cross-sectional view, showing a conventional toothed belt, of which an elastic tooth is larger in height than a tooth space of a pulley.
Figure 11B:
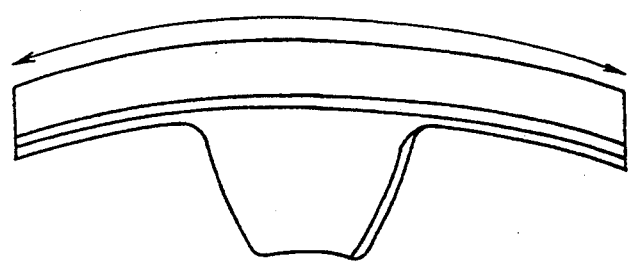
FIG. 11B is a schematic view, showing a state of engagement of the toothed belt with the pulley.

FIG. 11A is an enlarged cross-sectional view, showing a conventional toothed belt, of which an elastic tooth is larger in height than each tooth space of a pulley. FIG. 11B is a schematic view, showing a state of engagement of the toothed belt with the pulley. Japanese Examined Patent Publication Nos. 56-29141 and 57-51589 show that no localized bending is found in the aforesaid toothed belt, of which tensile cords and a back rubber portion assume an arcuate shape, as compared with the previously mentioned trapezoidal tooth. (see FIG. 11B).

Figure 12:
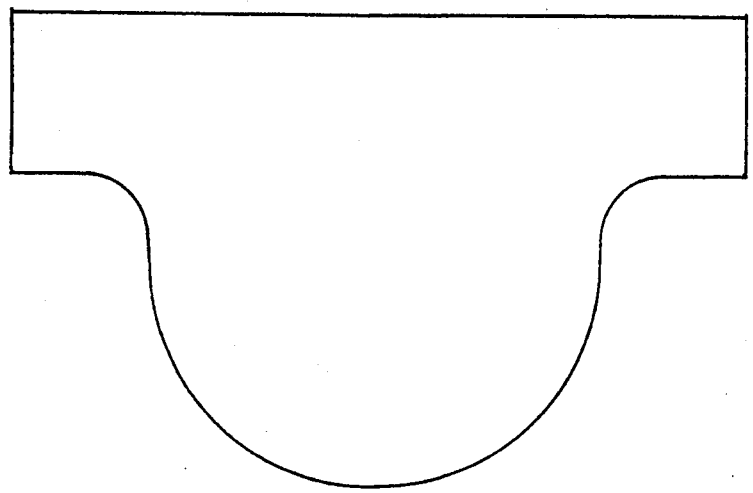
FIG. 12 is an enlarged cross-sectional view illustrating a conventional toothed belt, of which an elastic tooth has an arcuate tip portion.

FIG. 12 is an enlarged cross-sectional view, illustrating a conventional toothed belt, of which an elastic tooth has an arcuate distal end. Japanese Examined Patent Publication Nos. 52-20629, 57-1714, and 56-37457 show that no localized bending is found in the aforesaid toothed belt having the arcuate teeth, of which tensile cords and a back rubber portion assume an arcuate shape, as compared with the previously mentioned trapezoidal tooth.

Figure 13:
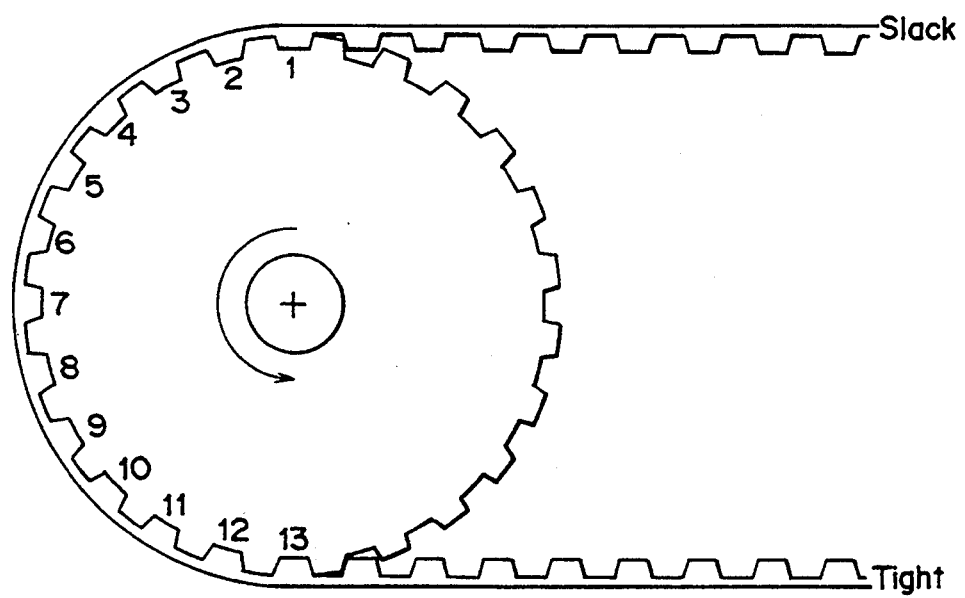
FIG. 13 is a schematic view, showing a state in which a toothed belt is wrapped around a pulley.

FIG. 13 is a schematic view, showing a state in which a toothed belt is wrapped around a pulley.

Next, conventional products of the toothed belts shown in FIGS. 10, 11A, 11B, and 12 were individually wrapped around the pulley, of which photographs were taken for image processing. Then, curvature of the tensile cords was measured for each portion of the belt teeth. The results revealed that the curvature is maximal at the dedendum portions and at the dedendum portions near the tooth root portions in all off the belts. That is, in order to achieve smooth winding of the toothed belt and less stress concentration, it is not necessarily required to increase the tooth depth $h_0$ over the depth $h_3$ of each pulley tooth space so as to apply pressure on the tooth tip points D by means of the pulley tooth spaces. Obviously, the essential thing is: an optimum ratio between tooth depth $h_0$ and tooth width $w_0$ of the elastic tooth 10; and, a configuration of the dedendum portion thereof.

Further, the toothed belt shown in FIG. 4, i.e., a product of the present invention, was designated as a present invention product 1, while the toothed belt shown in FIG. 12, i.e., a conventional product, was designated as a reference product 1. Stress analysis of the present invention product 1 and the reference product 1 was carried out on the basis of a large deformation-related finite element method (a FEM-based analysis method). (Reference is made to "Rubber Chemistry and Technology", Seki, Fukahori, et al., 1987, vol. 60, p. 856.)

FIGS. 14A through 14E are analytic views, showing states of engagement between the elastic tooth and the pulley in the process of the stress analysis.

FIG. 15 is a graph, illustrating variations in maximum major stresses between the engagement states of FIGS. 14A through 14E, the maximum major stresses being applied to three portions at the addendum and dedendum portions off the present invention product 1.

Figure 14A:
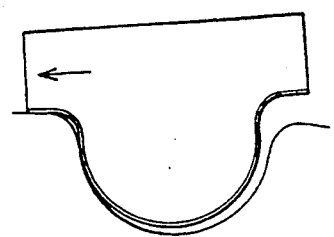
FIGS. 14A through 14E are analytic views, showing each state of engagement between an elastic tooth and a pulley in the process of stress analysis.
Figure 14B:
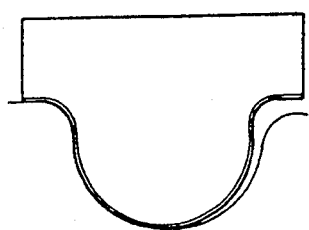
Figure 14C:
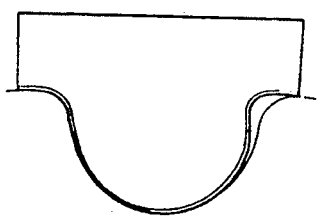
Figure 14D:
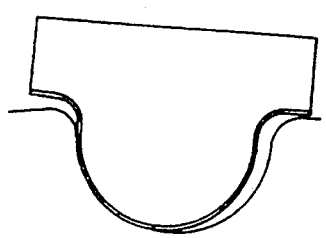
Figure 14E:
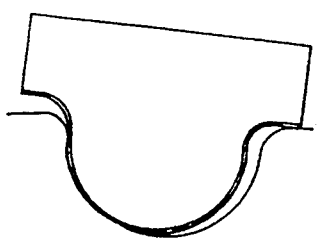

To be specific, the maximum major stresses are imposed on the present invention product 1 at the three portions thereof, i.e., a dedendum portion $N_1$, a tooth tip point D, and a dedendum portion $N_2$; and, FIG. 15 shows how the maximum major stresses are varied in the engagement states between FIG. 14A and FIG. 14E. In the graph, the maximum major stresses are designated by zero when showing negative values.

FIG. 16 is a graph, illustrating variations in maximum major stresses between the engagement states of FIGS. 14A through 14E, the maximum major stresses being applied to a dedendum portion $N_1$, a tooth tip point D, and a dedendum portion $N_2$ of the reference product 1. The maximum major stresses are designated by zero when showing negative values.

Figure 17A:
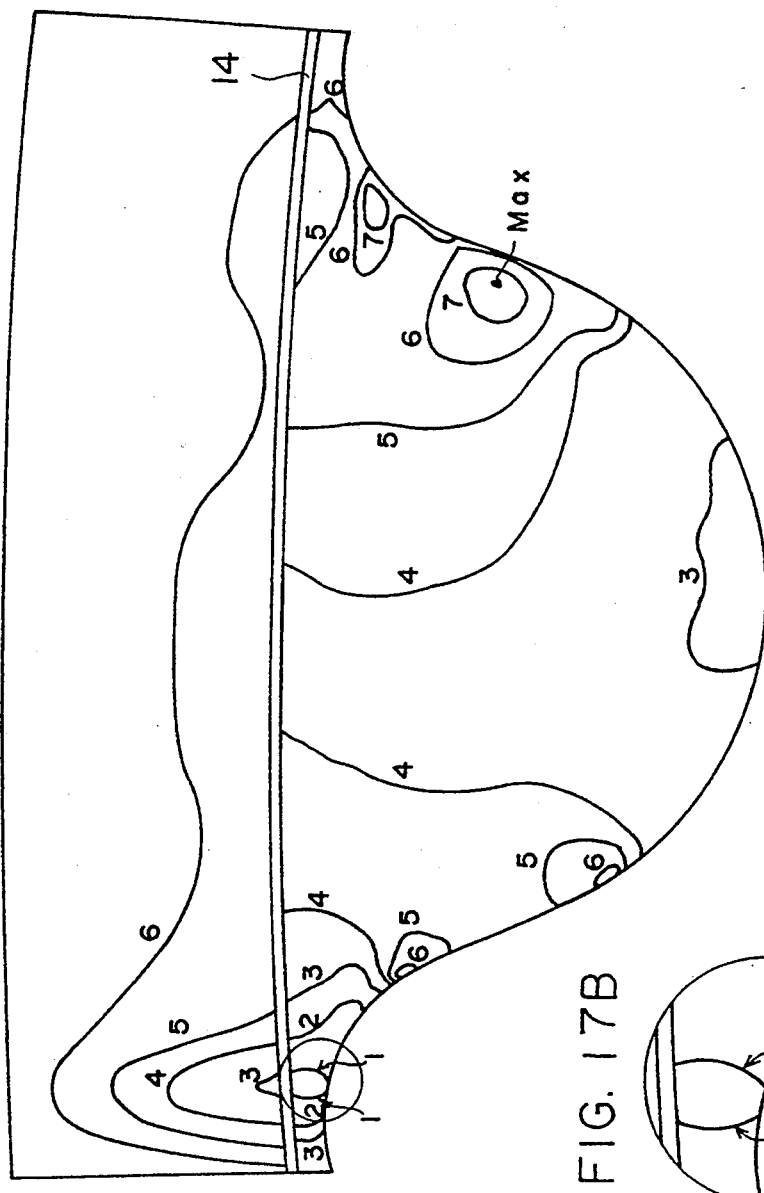
FIG. 17A is an analytic view, illustrating the maximum major stresses on the present invention product 1 in engagement state of FIG. 14C.
Figure 17B:
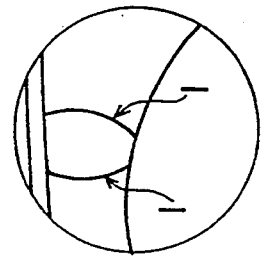
FIG. 17B is a partially enlarged, analytic view, illustrating a region at the dedendum portion $N_1$, which is enclosed by a circle in FIG. 17A.

FIG. 17A is an analytic view, illustrating the maximum major stresses on the present invention product 1 in the state of FIG. 14C. FIG. 17B is a partially enlarged, analytic view, illustrating a region at the dedendum portion $N_1$, which is enclosed by a circle in FIG. 17A. No stress concentration is found in the dedendum portion $N_1$.

Figure 18A:
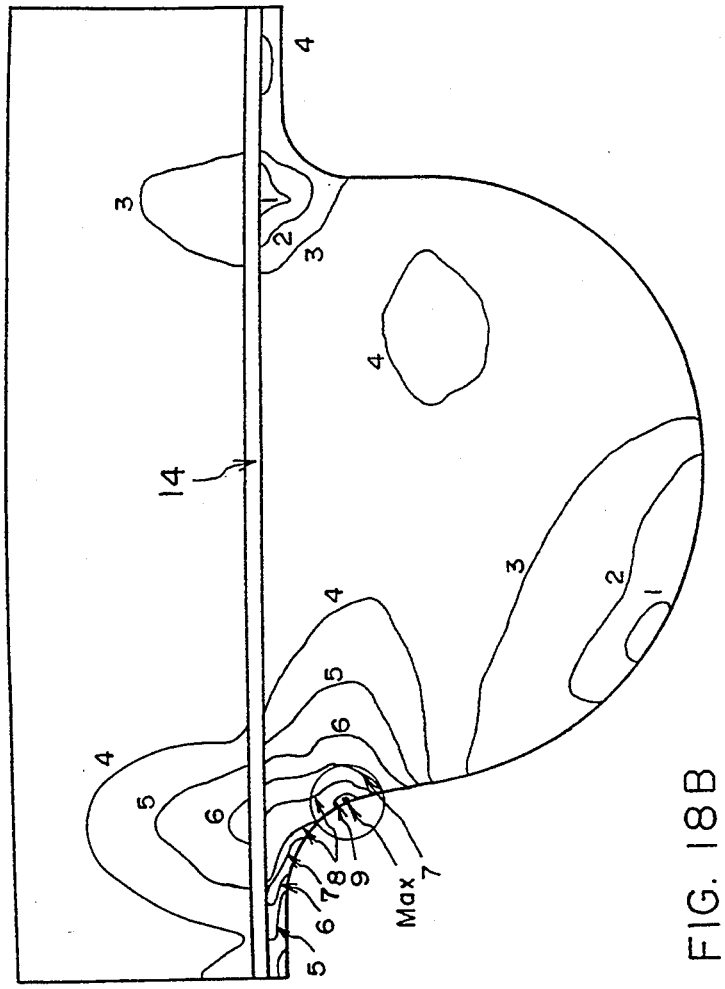
FIG. 18A is an analytic view, illustrating the maximum major stresses applied to the reference product 1 in engagement state of FIG. 14D.
Figure 18B:
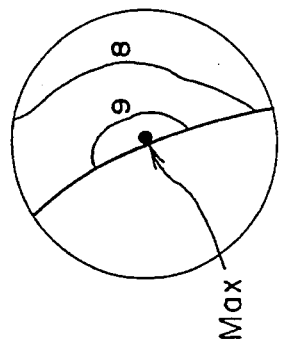
FIG. 18B is a partially enlarged, analytic view, illustrating a region at the dedendum portion $N_1$, which is enclosed by a circle in FIG. 18A.

FIG. 18A is an analytic view, illustrating the maximum major stresses on the reference product 1 in the state of FIG. 14D. FIG. 18B is a partially enlarged, analytic view, illustrating a region at the dedendum portion $N_1$, which is enclosed by a circle in FIG. 18A. Stress concentration is found in the dedendum portion $N_1$, in which a maximal value of the maximum major stresses is shown.

The above results showed that maximal values of the maximum major stresses on the dedendum portions were: 2.4 kgf/cm$^2$ for the present invention product 1; and, 5.0 kgf/cm$^2$ for the reference product 1.

The results revealed that a combination of the toothed belt of the present invention product and the pulley has achieved considerable improvements in stress concentration, as compared with the conventional product.

Experimental Example 2

Next, the previously mentioned skipping characteristics will be described in detail. Comparison is made between, for example, two types of belts which have the same tooth widths but different power-transmitting abilities (skipping torque). (1) When the belts are set with the same axis-to-axis tension, one of the belts, which has greater skipping torque, has greater power-transmitting ability than the other. That is, when the belt having greater power-transmitting ability is used to provide the same power-transmitting ability as the belt having less power-transmitting ability, the former can have a correspondingly reduced tooth width. Accordingly, the above toothed belt having greater power-transmitting ability and a less tooth width is preferred when being used to transmit power in automobiles because space saving is thereby achievable.

(2) When the axis-to-axis tension is changed for each setting of the toothed belts so as to provide equal power-transmitting ability to the toothed belts, the axis-to-axis tension can be decreased for the toothed belts having greater skipping torque. This arrangement decreases the load on the belt tensile cords and compressive stress on the belt dedendum portions, and consequently increases belt durability and life time. Accordingly, the use of such a toothed belt for the transmission of power in automobiles is desirable because forces acting between a crank shaft and a cam shaft are thereby decreased, which allows for a reduction of load imposed on the entire engine.

Next, two pulleys, each having 22 teeth, were provided with each of the following: the present invention product 1 (FIG. 4) in the experimental example 1; the reference product 1 (FIG. 12) in the same example 1; and, the conventional toothed belt shown in FIGS. 11A and 11B, which is hereinafter called a reference product 2. Thereafter, the pulleys were rotated at 500 rpm in order to measure skipping torque and axis-to-axis tension. The results are shown in FIG. 19.

Figure 19:
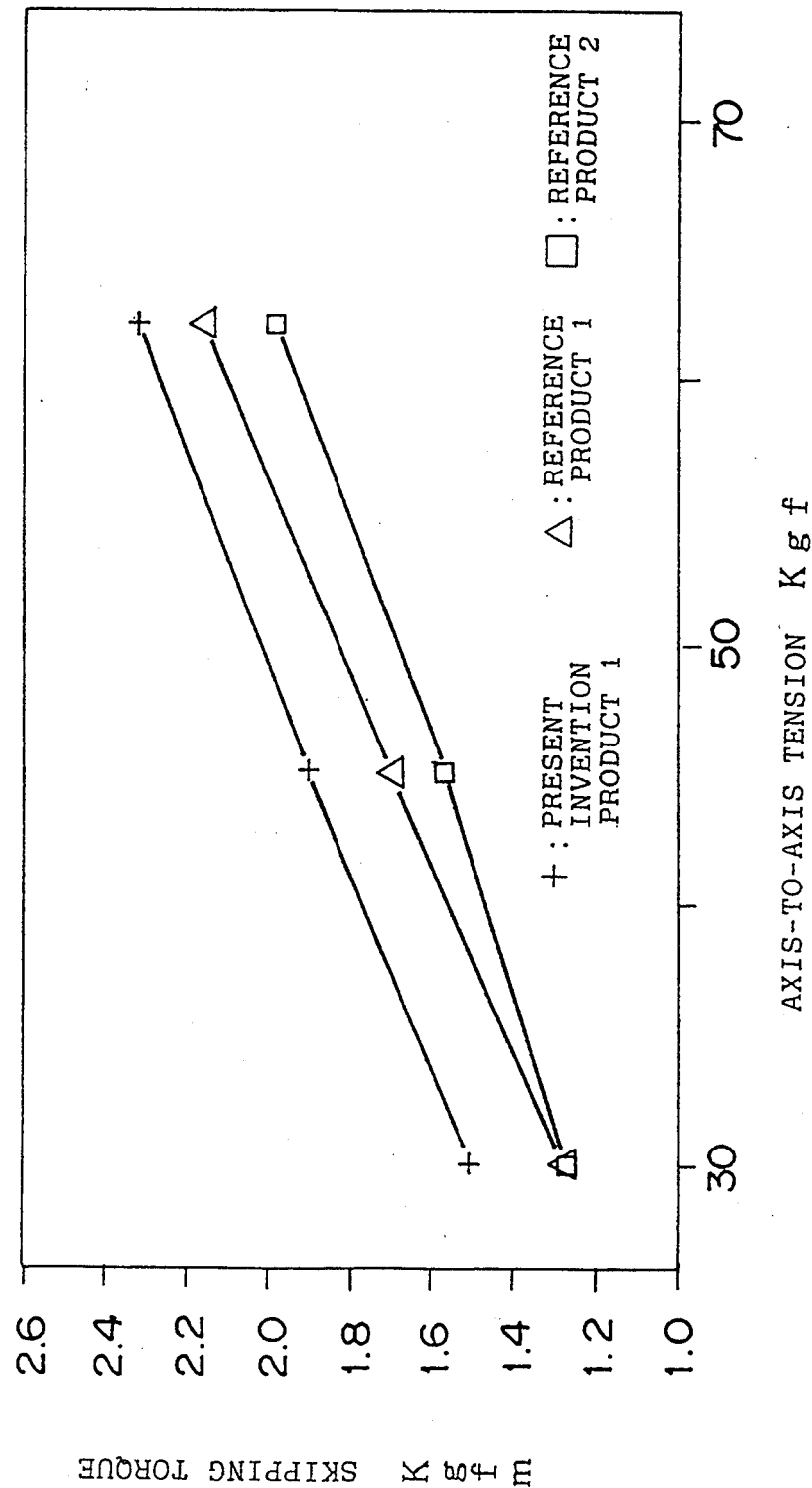
FIG. 19 is a graph, illustrating a relationship between skipping torque and axis-to-axis tension in connection with respective toothed belts and pulleys, the respective toothed belts including the present invention product 1, the reference product 1, and a reference product 2.

FIG. 19 is a graph, illustrating a relationship between the skipping torque and axis-to-axis tension in connection with the respective toothed belts of the present invention product and the reference products. As evidenced by FIG. 19, the toothed belt according to the present invention provided high-skipping torque and superior power-transmission ability at any level of the axis-to-axis tension.

Experimental Example 3

Toothed belts, which have respective shapes of the aforesaid present invention product 1 and the reference product 2, were fabricated by the same manufacturing process, using the same mixture of raw materials, as shown in Table 1 below. Thereafter, noise was measured for each of the fabricated toothed belts.

TABLE 1

| RAW MATERIAL | compound amount |
| --- | --- |
| Hydrogenated NBR (ZP2000, Japan Zeon) [acrylonitrile amount: 36% by weight, iodine value: 8] | 80 |
| EPDM (ND1470, Du Pont) [non-conjugate diene constituent: 1,4-hexadiene, iodine value: 14] | 20 |
| FEF carbon black | 50 |
| Zinc oxide | 5 |
| Stearic acid | 1 |
| Sulfur | 0.5 |
| tetramethyl thiuram disulfide | 1.5 |
| 2-mercaptobenzothiazole | 0.5 |

Figure 20:
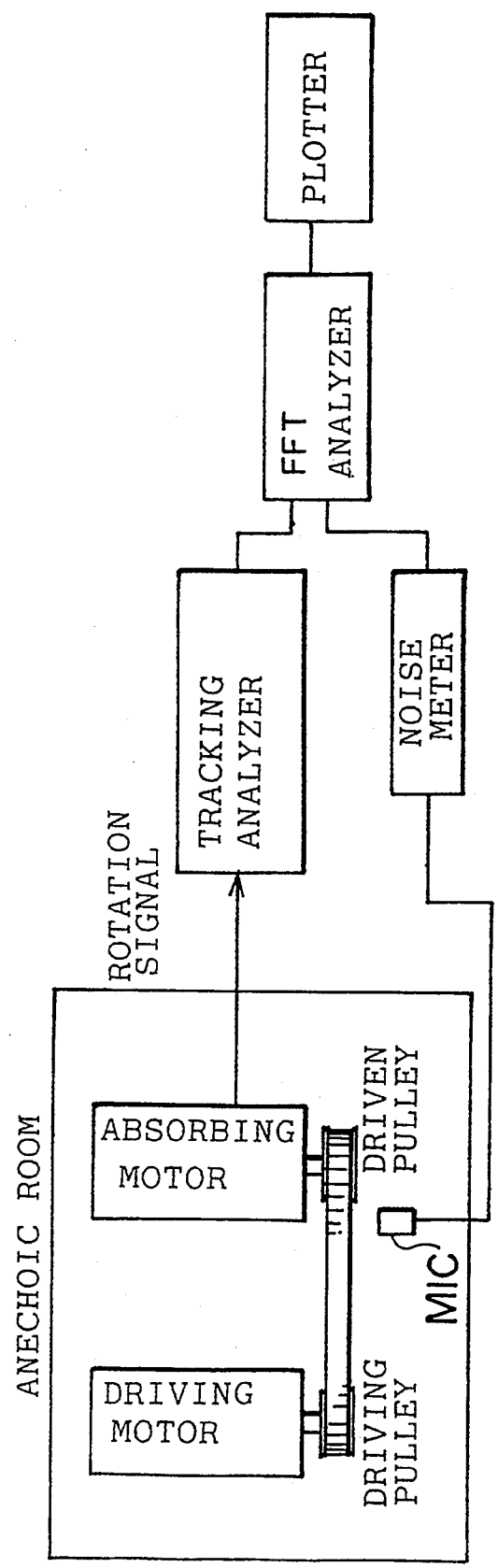
FIG. 20 is a schematic block diagram, showing a process for measuring noise; and, FIG. 21 is a graph, illustrating a relationship between pulley-revolving speeds and noise levels in connection with respective toothed belts of the present invention product 1 and the reference product 2.

FIG. 20 is a schematic block diagram, showing a process for measuring the noise.

A driving motor and an absorbing motor (a motor for load generation) were placed in an anechoic room. A noise meter was positioned in front of a driven pulley which shows the highest noise level. In this state, rotation speeds and noise levels of a driving pulley were measured. The results are shown in FIG. 21.

Figure 21:
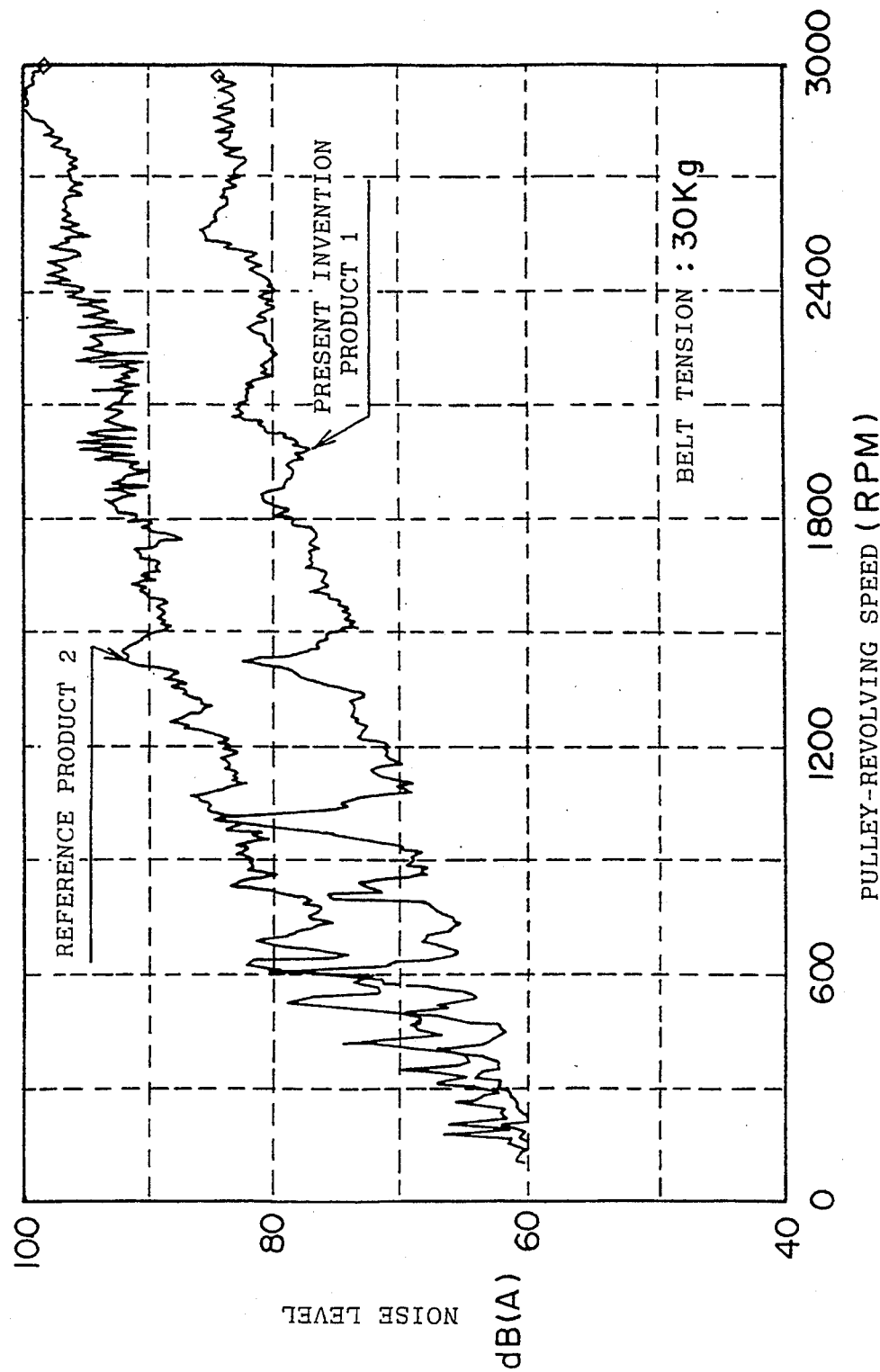

FIG. 21 is a graph, illustrating a relationship between pulley rotation speeds and noise levels in connection with the respective toothed belts of the present invention product 1 and the reference product 2. As evidenced by FIG. 21, the toothed belt according to the present invention achieved more than a 10 dB decrease in noise at any of the rotation speeds, as compared with the conventional toothed belt of the reference product 2, in spite of being formed of the same raw materials.

The toothed belt according to the present invention having the above structure decreases stress concentration and strain, both of which occur at the dedendum portions, and further prevents localized bending of the belt tensile cords. The toothed belt thereby exhibited improved performance of a high-load capacity, increased durability, and low noise. In the second aspect of the present invention, a toothed belt, which has the aforesaid high-load capacity and increased durability, further exhibited good performance in which no skipping occurs, even under high loads. Furthermore, a combination of the toothed belt and a toothed belt-adapted pulley, the latter being adapted for use with the former, allows smooth engagement with each other by minimizing interference therebetween when the toothed belt is moved into and out of engagement with the pulleys. Reduced vibration and low noise are thereby achieved. The above combination further exhibited improved performance of: increased durability under high loads; and, the absence of skipping under high loads.

What is claimed is:

1. A toothed belt wrapped around a plurality of toothed pulleys and having a plurality of elastic teeth which engage teeth of said toothed pulleys, said toothed belt comprising:

a back rubber portion and tensile cords;

each of said elastic teeth having a tooth depth equal to or less than a depth of each tooth space of said toothed pulleys;

each of said elastic teeth further comprising a dedendum portion of substantially curvilinear cross-section; and each of said elastic teeth having an overall cross-sectional peripheral length, $m_0$, at one pitch and each dedendum portion having a linear length portion, $m_1$, where $m_1/m_0$ is 0.1 or less, each of said elastic teeth further having a cross-sectional shape at one pitch formed by a smooth chain of arc portions which have two or more different radiuses.

2. A toothed belt according to claim 1 wherein:

each of said elastic teeth has a tooth depth, $h_0$; and said back rubber portion has a thickness, $h_2$, said ratio of $h_2/h_0$ equaling 0.5 or less.

3. A toothed belt according to claim 1 wherein:

an angle, $\theta$, defined between a tangent, which extends through an inflection point of said elastic tooth and a line extending in a direction perpendicular to a pitch line through said inflection point, where $\theta$ lies within the range of 5° to 30°.

4. A toothed belt according to claim 1 wherein:

each of said teeth has a depth, $h_0$, and a tooth width, $w_0$, where the ratio $h_0/w_0$ is within the range of 0.35 to 0.75.

5. A toothed belt according to claim 1 wherein:

each of said elastic teeth has a depth, $h_0$, and a distance between an inflection point and a land line of said elastic tooth, $h_1$, where the ratio $h_1/h_0$ is within the range of 0.2 to 0.5.

6. A toothed belt-adapted pulley having a plurality of teeth around which a toothed belt is trained, said toothed belt having a plurality of elastic teeth of which root portions have substantially curvilinear cross-sections, said toothed belt-adapted pulley comprising:

addendum portions of each of said teeth of said pulley, each portion having a curvilinear cross-section;

each tooth of said pulley having a tooth space with a depth equal to, or greater than, a tooth depth of each one of said plurality of elastic teeth to be engaged therewith; and each of said teeth of said pulley having an overall cross-sectional peripheral length at one pitch, $n_0$, said addendum portion having a length, $n_1$, defined by the intersection of, a tip circle where the ratio $n_1/n_0$ is 0.1 or less, each of said teeth of said pulley further having a cross-sectional shape at one pitch formed by a smooth chain or arc portions which have two or more different radiuses.

7. In combination, a toothed belt and a toothed belt-adapted pulley comprising:

a toothed belt wrapped around a plurality of toothed pulleys, said belt comprising a plurality of elastic teeth which engage with teeth of said toothed pulleys;

each of said elastic teeth having a depth equal to or less than a depth of each tooth space of said toothed pulleys;

each of said elastic teeth further comprising a dedendum portion having a substantially curvilinear cross-section, each of said elastic teeth having an overall cross-sectional peripheral length, $m_0$, at one pitch and a dedendum portion having a linear length, $m_1$, where the ratio $m_1/m_0$ is 0.1 or less;

each of said pulleys comprising a plurality of teeth;

each of said pulleys further comprising an addendum portion having a curvilinear cross-section, each tooth space of said pulley having a depth equal to or greater than said tooth depth of said elastic tooth to be engaged therewith;

each tooth of said pulley having an overall cross-sectional peripheral length, $n_0$, at one pitch, and each addendum portion having a length, $n_1$, defined by the intersection of a tip circle where the ratio $n_1/n_0$ is 0.1 or less.

8. A combination of a toothed belt and a toothed belt-adapted pulley according to claim 7 wherein:

a circle centered at a revolving shaft of said pulley and extending through inflection points $A_p$, $E_p$, and $I_p$ of said pulley is spaced apart from a pulley tip circle by a distance $h_p$, and a circle centered at said revolving shaft of said pulley and extending through inflection points $J_b$ and $K_b$ at a tooth portion of said toothed belt is spaced apart from said pulley tip circle by a distance $h_b$, $Q_p$ is defined as $(h_p - h_b)/h_b$ where $-0.3 \leq Q_p \leq 0.5$.

9. A combination of a toothed belt and a toothed belt-adapted pulley according to claim 7 wherein:

a circle centered at a revolving shaft of said pulley and extending through inflection points $A_p$, $E_p$, and $I_p$ of said pulley and an addendum portion or said dedendum portion of said elastic tooth of said toothed belt intersect at a point $L_p$, and arc portions between $A_p$ and $E_p$ and between $A_p$ and $L_p$ on said circle have respective lengths of $r_0$ and $r_1$, backlash R between said elastic tooth and said pulley is defined as $(r_0 - r_1)/r_0$ where $R \leq 0.20$.

* * * * *